United States Patent [19]

Parlette

[11] 4,005,019
[45] Jan. 25, 1977

[54] GRAVITATIONAL SEPARATOR

[75] Inventor: Joseph N. Parlette, Pickering Village, Canada

[73] Assignee: L.S. Love & Associates Limited, Brampton, Canada

[22] Filed: Aug. 11, 1975

[21] Appl. No.: 603,888

Related U.S. Application Data

[63] Continuation-in-part of Ser. No. 509,779, Sept. 27, 1974, abandoned.

[52] U.S. Cl. .................. 210/525; 210/527; 210/531
[51] Int. Cl.² ........................... B01D 21/12
[58] Field of Search ........... 210/49, 83, 207, 208, 210/209, 195 M, 195 O, 519, 520, 521, 522, 523, 524, 525, 526, 527, 528, 529, 530, 531

[56] References Cited

UNITED STATES PATENTS

| 2,095,394 | 10/1937 | Morehead | 210/525 X |
|---|---|---|---|
| 2,098,463 | 11/1937 | Morehead | 210/525 |
| 2,382,409 | 8/1945 | Finney | 210/530 |
| 2,768,749 | 10/1956 | Easterday | 210/528 X |
| 3,067,878 | 12/1962 | Genter et al. | 210/528 X |
| 3,084,801 | 4/1963 | Bounin | 210/528 |
| 3,335,447 | 8/1967 | Olson et al. | 210/531 X |
| 3,498,466 | 3/1970 | Fechter et al. | 210/527 X |
| 3,679,063 | 7/1972 | Pate | 210/531 X |
| 3,756,418 | 9/1973 | Pentz et al. | 210/527 X |
| 3,788,477 | 1/1974 | Love | 210/525 X |
| 3,797,664 | 3/1974 | Pentz et al. | 210/83 |

Primary Examiner—Charles N. Hart
Assistant Examiner—Robert H. Spitzer
Attorney, Agent, or Firm—Rogers, Bereskin & Parr

[57] ABSTRACT

The disclosure relates to clarifiers for use in the gravity separation of suspended particles from liquids. A clarifier according to the invention includes a tank having a sludge outlet through which settled sludge can be removed and means for conveying settled sludge towards said outlet. A gantry is supported for movement above the surface of liquid in the tank. Gantry drive means are provided and are adapted to cause the gantry to perform repeated passes over said surface. A sludge conveyor device is submerged in liquid in the tank in use and is positioned at a clearance above the bottom of the tank. Conveyor drive means are coupled to the sludge conveyor device. The device is coupled to the gantry by support means arranged so that the device moves with the gantry and sweeps over the bottom of the tank as the gantry performs said repeated passes above the surface of liquid. The conveyor device has at least one sludge contacting surface which, when the device is in operation, moves in a direction transverse to the direction of movement of the gantry so as to move sludge which has settled on the bottom of the tank in said transverse direction towards the outlet. Conveyor means according to the invention may also be used in other apparatus for use in the gravity separation of suspended material from a liquid.

4 Claims, 27 Drawing Figures

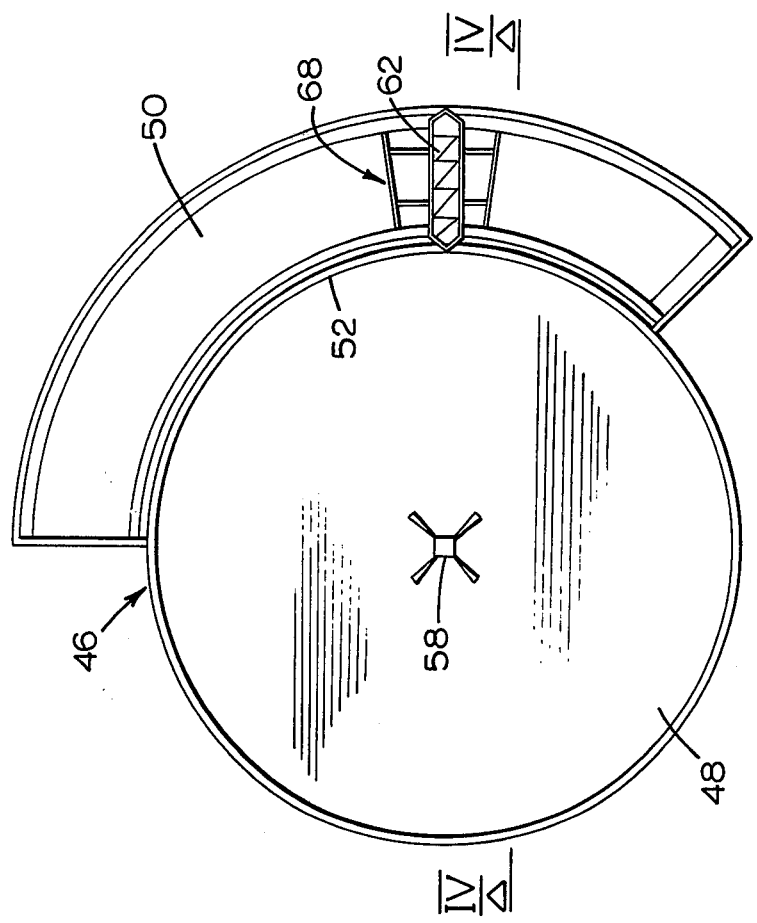
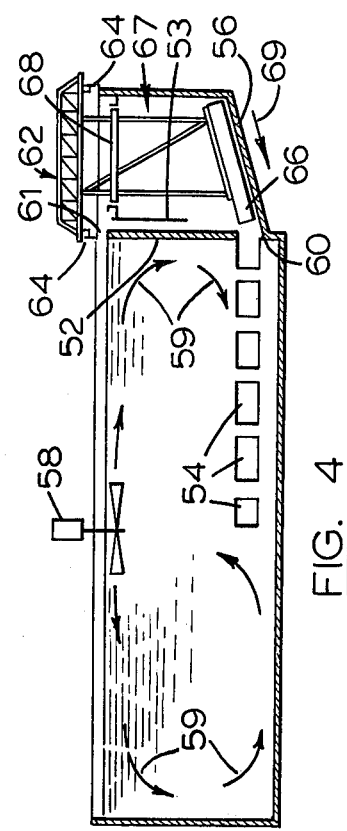
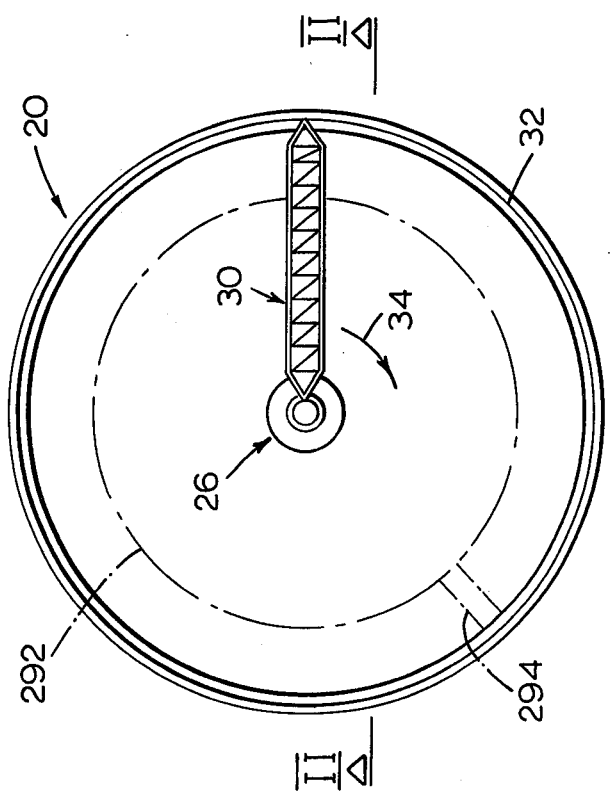
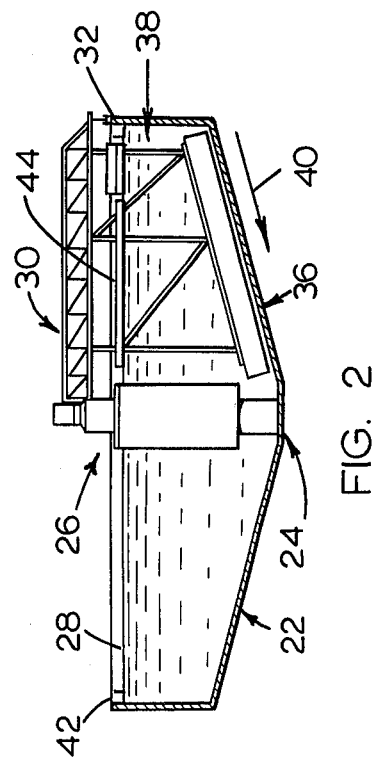

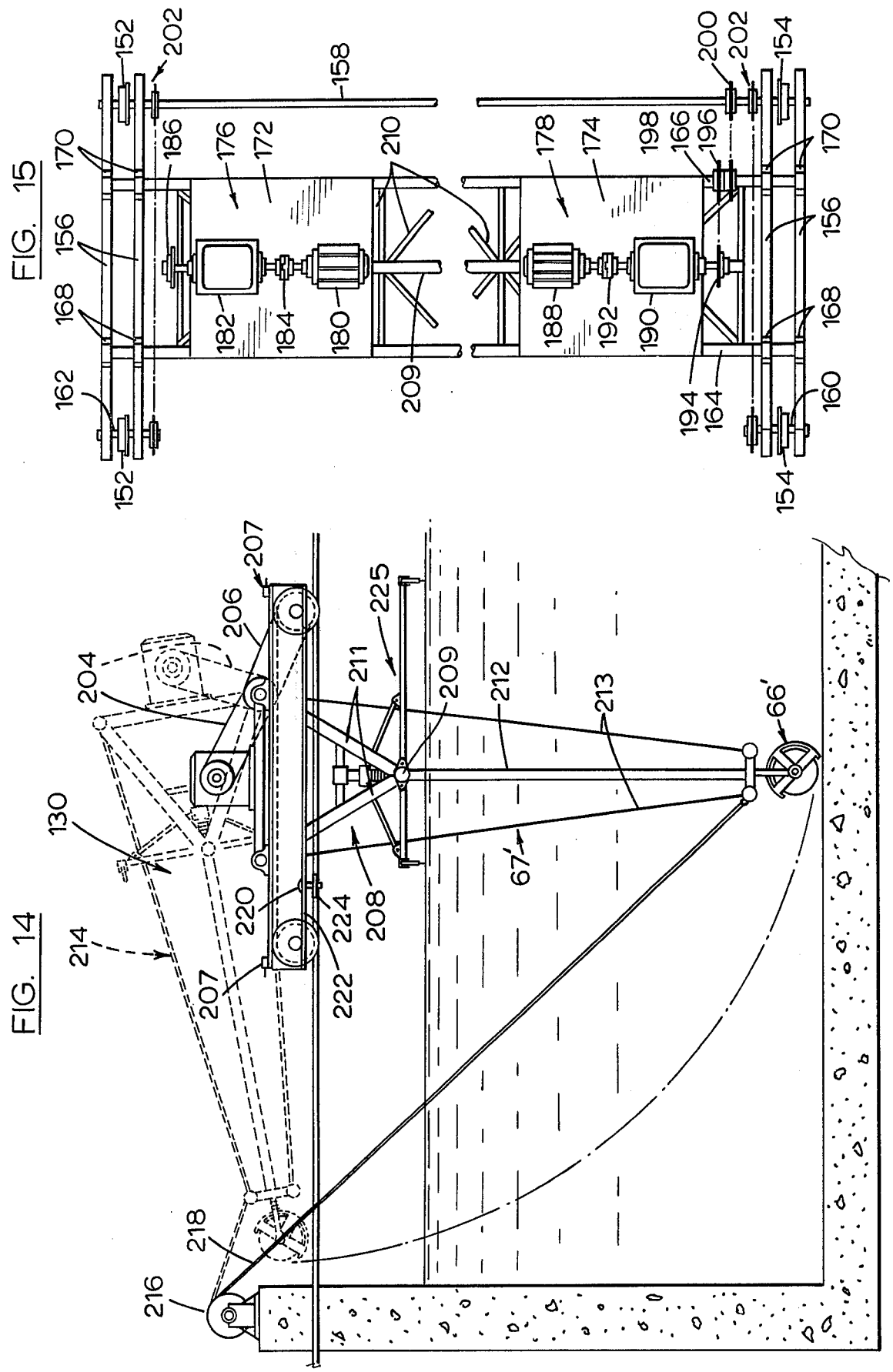

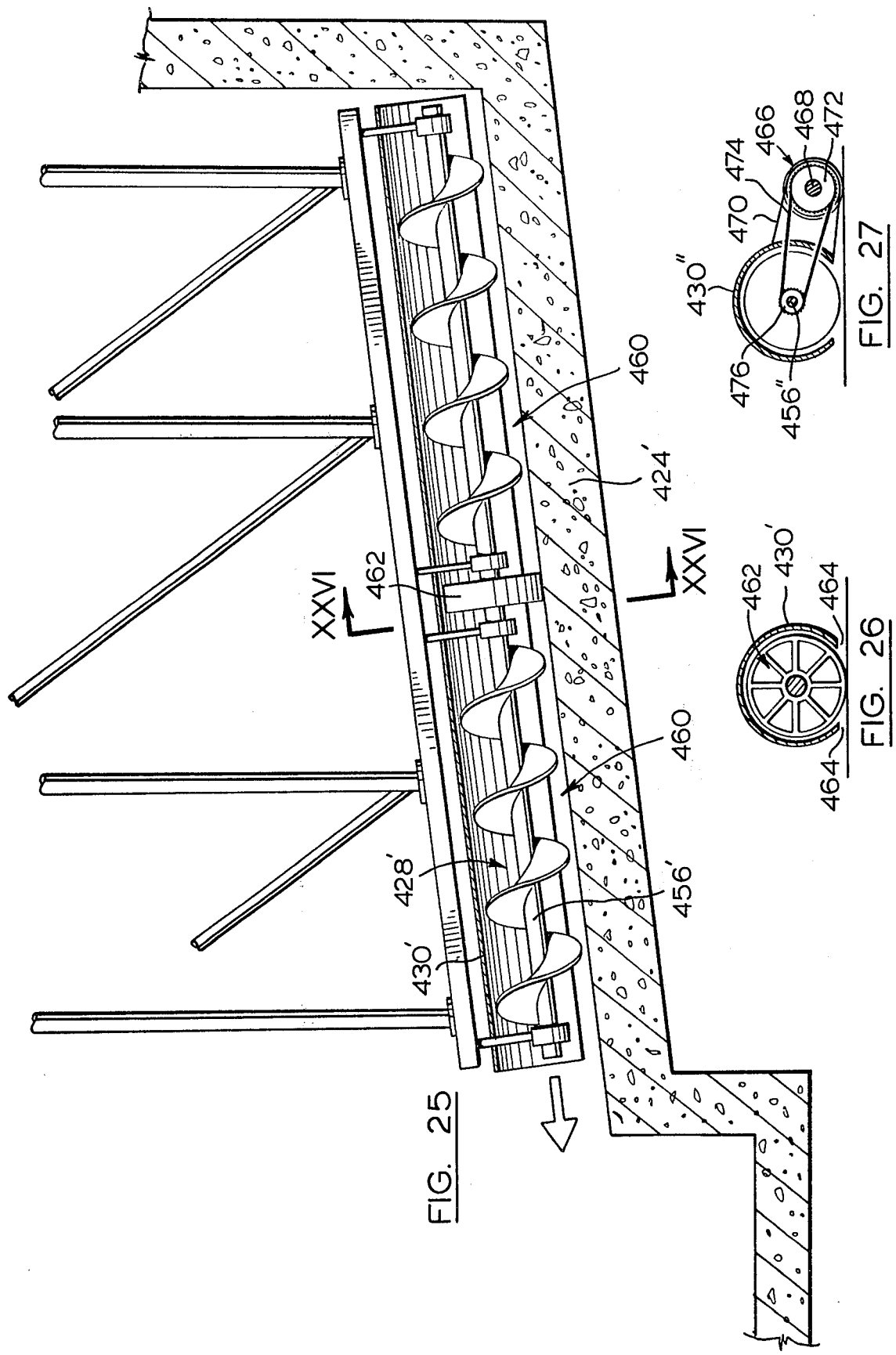

GRAVITATIONAL SEPARATOR

This application is a Continuation-in-part of application Ser. No. 509,779 filed Sept. 27, 1974 now abandoned.

This invention relates to apparatus used in the gravity separation of suspended material from liquids.

An apparatus of this kind (called a clarifier) is used to remove from liquids such as industrial or domestic waste water, suspended particles having a specific gravity greater than that of the liquid in which they are suspended. The liquid with the particles in suspension is introduced into a clarifier and the particles settle to the bottom. The resulting mass of settled particles is called a sludge and is removed from the clarifier at a discharge location.

In the activity sludge treatment of waste water, microorganisms (called activated sludges) are encouraged to feed on organic material in the waste water in the presence of air (oxygen). The products of this process are carbon dioxide, water and additional micro organisms or activated sludge. This process, since it requires oxygen, is usually carried out in a reaction vessel called an aeration basin, where the mixture of waste water and activated sludge is aerated. After aeration, the sludge mass is separated from the waste water by gravity settling in a clarifier. The purified waste water is discharged as treated effluent while some of the activated sludge is recycled back to the aeration basin for re-seeding of the biological process.

Activated sludges deteriorate with time and it is important that these sludges be removed from the clarifier as quickly as possible. Inert sludges do not degrade and the time taken to remove the sludge from the clarifier does not cause deterioration of the sludge quality. Nevertheless, prompt removal of such sludges may be desirable for other reasons.

Conventional clarifiers employ sludge scraping mechanisms to remove sludges. Two different types of mechanisms are currently in common use. A clarifier which is of rectangular shape in plan is normally equipped with a submerged continuous chain conveyor having wooden flights which slowly scrape the sludge along the bottom into a sump at one end of the clarifier. In the case of clarifiers which are of circular shape in plan, the sludge scraping mechanism includes a number of submerged plough type blades suspended from a gantry which rotates above the level of the liquid in the clarifier, so that the blades rotate and scrape the bottom of the clarifier. The blades are angled so that they tend to move the sludge inwardly towards an outlet at the centre of the clarifier. With both types of clarifiers considerable time is required for the scraper mechanism to move the sludge to the point of discharge.

In a conventional circular clarifier, the speed of rotation of the gantry carrying the scraper may be in the range 40 to 60 minutes per rotation. Due to the type of scraping mechanism employed, for a typical circular clarifier, it may take from several hours to move a batch of sludge from the periphery of the bottom of the clarifier to the discharge location at the centre. When dealing with activated sludges, the sludge is usually in an environment of low oxygen content during this period with the result that it tends to deteriorate. If the removal time is too long the sludge may deteriorate to a point at which it is not completely effective when returned to the aeration basin. Further, the efficiency of the activated sludge treatment process depends on the activated sludge content of the aeration basin. Accordingly, the sludge should be removed from the clarifier and returned to the aeration basin as quickly as possible if the process is to proceed efficiently.

In view of the slow speed with which sludge is moved by the conventional scraper mechanisms, the size of the clarifier is restricted if substantial sludge deterioration is to be avoided. In other words, large clarifiers have not hitherto been built because the substantial time which would be required to remove sludge from the clarifier would result in an unacceptable degree of sludge deterioration. It is not possible to speed up a conventional sludge scraper mechanism without disturbing the sludge and redistributing the settled particles. Clarifiers are built with sloping floors to assist sludge flow. However, even then, clarifier size is restricted since the differential in levels across the floor of the clarifier would be too great in the case of a clarifier of increased width.

An object of the present invention is to provide improvements in clarifiers.

Broadly considered, there is provided a clarifier which includes a tank for receiving a liquid to be clarified. The tank includes a bottom having an outlet through which settled material can be removed. A gantry is supported for movement above the surface of liquid in the tank. Gantry drive means are provided and are adapted to cause the gantry to perform repeated passes over said surface. A conveyor device for settled material is submerged in liquid in the apparatus in use and is positioned at a clearance above the bottom of the tank. Conveyor drive means are coupled to the support means arranged so that the device moves with the gantry and sweeps over the bottom of the tank as the gantry performs said repeated passes above the surface of liquid in the tank. The conveyor device has at least one settled-material contacting surface which, when the device is in operation, moves in a direction transverse to the direction of movement of the gantry so as to move material which has settled on the bottom of the tank in said transverse direction towards the outlet.

The invention will be better understood by reference to the accompanying drawings in which:

FIG. 1 is a plan view of a circular clarifier according to the invention;

FIG. 2 is a vertical sectional view on line II—II of FIG. 1;

FIG. 3 is a plan view of a circular aeration basin and an arcuate clarifier formed as an integral unit;

FIG. 4 is a vertical sectional view on line IV—IV of FIG. 3;

FIG. 14 is a view in the direction of arrow A in FIG. 5 and shows how the screw conveyor of the clarifier can be raised for maintenance and inspection purposes;

FIG. 15 is a plan view corresponding to FIG. 14;

FIG. 25 is a view similar to FIG. 24 showing an arrangement in which the drive wheel runs on the floor of the clarifier;

FIG. 26 is a cross-sectional view on the line XXVI—XXVI of FIG. 25; and,

FIG. 27 is a view similar to FIG. 26 showing an alternative drive arrangement.

Figure 5:
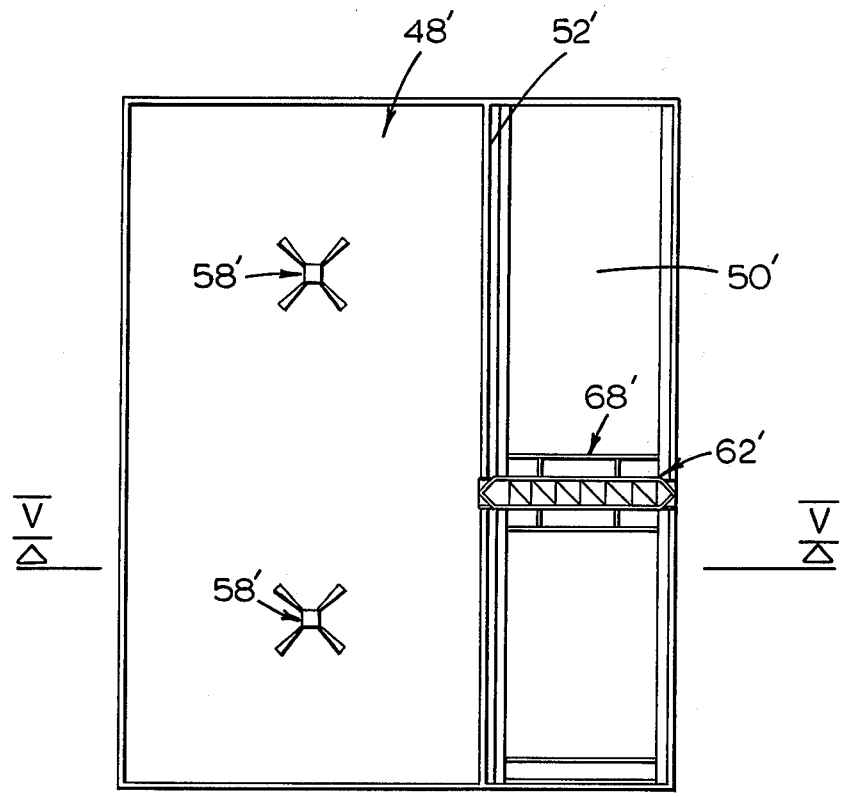
FIG. 5 is a plan view of a rectangular aeration basin and a rectangular clarifier formed as an integral unit.

Reference will first be made to FIGS. 1 and 2 which show a circular clarifier having sludge conveyor means according to the invention. FIGS. 3 to 6 show other types of clarifiers employing sludge conveyor means in accordance with the invention. However, it is to be understood that the three examples shown in the first six figures are not limitive of potential application of the invention.

The clarifier shown in FIGS. 1 and 2 is a so-called secondary clarifier used as a part of a conventional biological waste-water treatment system, which also includes a primary clarifier and an aeration basin. Neither the primary clarifier nor the aeration basin have been shown since they form no part of the invention. It is sufficient to note that waste water to be treated is first conducted to the primary clarifier where primary settling of solids occurs. The settled solids are removed to a sludge digestor and the digested sludge is removed for treatment and disposal. The effluent from the primary clarifier is directed to the aeration basin where it is treated with activated sludge which removes organic material from the waste water. The effluent from the aeration basin is directed to the secondary clarifier shown in FIGS. 1 and 2 where the activated sludge settles from the liquid and the clarified liquid is removed.

In FIGS. 1 which 2 the clarifier is generally denoted 20 which is basically of conventional concrete or steel construction. The tank has a bottom 22 which slopes towards the centre where a sludge outlet 24 is provided. A column structure 26 upstands at the centre of the tank and projects above the level 28 of the water therein. A gantry 30 is coupled at one end to the structure 26 and at its outer end is provided with wheels 32 which run on a track extending around the periphery of the tank. A motor (not shown) is provided in the top of the structure 26 to continuously rotate the gantry 30 unidirectionally as indicated by the arrow 34 in FIG. 1 so as to cause the gantry to perform repeated passes above the surface of the water in the tank. The motor drives the gantry so that the linear speed of the outer end of the gantry is in the range 1 to 10 feet per minute.

Submerged in the water in the clarifier is a sludge conveyor device generally indicated at 36. The device is indicated only generally in FIG. 2 and will be more specifically described in due course with reference to later figures. The device 36 is suspended from the gantry 30 by way of a support structure generally denoted 38 and is positioned with its lower edge at a slight clearance from the bottom of the tank. Accordingly, as the gantry 30 rotates, the conveyor device 36 moves with it and repeatedly sweeps above the bottom of the tank. As will be described later, the conveyor device 36 is adapted to move the sludge in a direction transverse to the direction of movement of the gantry 30, inwardly towards the centre of the clarifier, so as to convey settled sludge towards the outlet 24 as indicated by the arrow 40 in FIG. 2. The sludge can then be withdrawn from the tank by way of the outlet 24 as required. Some of the settled sludge is returned to the aeration basin and excess sludge is pumped to the primary clarifier where it settles and is removed. Clarified water is removed from the said surface of the water in the tank by way of launders 42 around the inner peripheral wall of the tank.

The support structure also carries a skimmer 44 for removing scum from the surface of the liquid. The construction of the skimmer will be more specifically described later.

The clarifiers shown in FIGS. 3 to 6 are integral clarifiers such as those described and claimed in U.S. Pat. No. 3,788,477, in which an aeration basin and a clarifier are formed as one integral unit. Referring to FIGS. 3 and 4, the unit shown in these figures is denoted 46 and includes an aeration basin 48 which is of circular shape in plan and a clarifier 50 which is of arcuate shape and is integrally combined with the clarifier so as to extend around approximately three-eights of its periphery. The aeration basin 48 and clarifier 50 are separated by a baffle 52 which is formed by part of the wall of the aeration basin adjacent the clarifier. A second, short baffle 53 is positioned parallel to and spaced from baffle 52 at the clarifier side of the latter. Baffle 52 is of reduced height compared with the remainder of the wall of the basin to allow the passage of waste water and activated sludge into the clarifier from the aeration basin. Further, the baffle 52 is formed adjacent its lower margin with a series of rectangular apertures 54 (FIG. 4) which form outlets from the clarifier and are intended to allow sludge to return from the clarifier to the aeration basin. The bottom 56 of the clarifier is inclined downwardly towards the aeration basin and its inner edge is aligned with the lower edges of the apertures 54. As is conventional in an aeration basin, a standard mechanical aerator diagrammatically indicated at 58 is provided in the centre of the aeration basin 48 to establish a water flow pattern in the basin as indicated by the arrows 59. Some of the water flows over the top of baffle 52 as indicated by arrows 60, this flow being controlled by adjustable flow gates (indicated at 61) on top of the baffle.

A gantry 62 is mounted above the level of the water in the clarifier 50 and is supported at its ends on rails 64 which extend along respectively opposite sides of the clarifier wall. The gantry is adapted to be reciprocated along the rails so as to perform repeated passes over the clarifier. One method of driving the gantry will be described later. As in the embodiment previously described, a sludge conveyor 66 is mounted in the clarifier parallel to and at a slight clearance from its bottom 56. The conveyor is suspended from the gantry 62 by a support frame 67 which carries a scum skimmer 68. Accordingly, the conveyor 66 sweeps over the bottom of the clarifier as the gantry 62 moves back and forth on the rails 64. The conveyor is adapted to move the sludge inwardly in the direction of arrow 69 and through the apertures 54 in the baffle 52 into the aeration basin 48. At this point, the settled sludge delivered through the apertures 54 is picked up by the currents in the aeration basin and by the liquid flow 61 down the outer side of the baffle 52 (the clarifier side) and is returned to circulation in the aeration basin.

Figure 6:
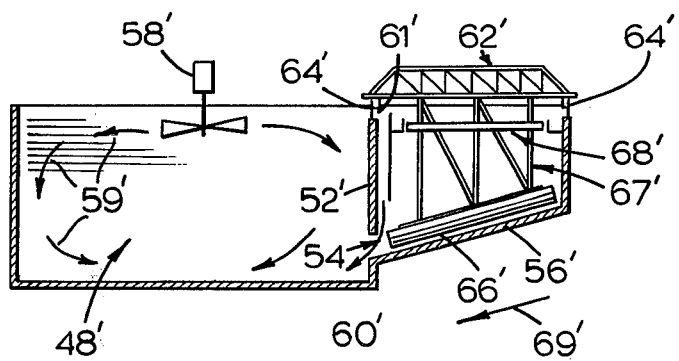
FIG. 6 is a vertical sectional view on line VI—VI of FIG. 5.

FIGS. 5 and 6 show a clarifier which is basically similar to that shown in FIGS. 3 and 4, but which is of rectangular shape in plan. Primed reference numerals have been used in FIGS. 5 and 6 to denote parts which are similar to those referred to in connection with FIGS. 3 and 4.

In the embodiment of FIGS. 5 and 6, the aeration basin 48' is of rectangular shape in plan and is provided with two mechanical aerators 58'. The clarifier 50' is also of rectangular shape in plan and is positioned along one side of the aeration basin. The bottom of the clarifier slopes downwardly towards the aeration basin as in the previous embodiment. The sludge conveyor device is denoted 66' and is carried by a gantry 62' which is movable rectilinearly along the clarifier and is mounted at opposite ends on rails 64'. The conveyor delivers settled sludge in the direction of arrow 69' through apertures 54' in the baffle 52' between the aeration basin and the clarifier.

Figure 7:
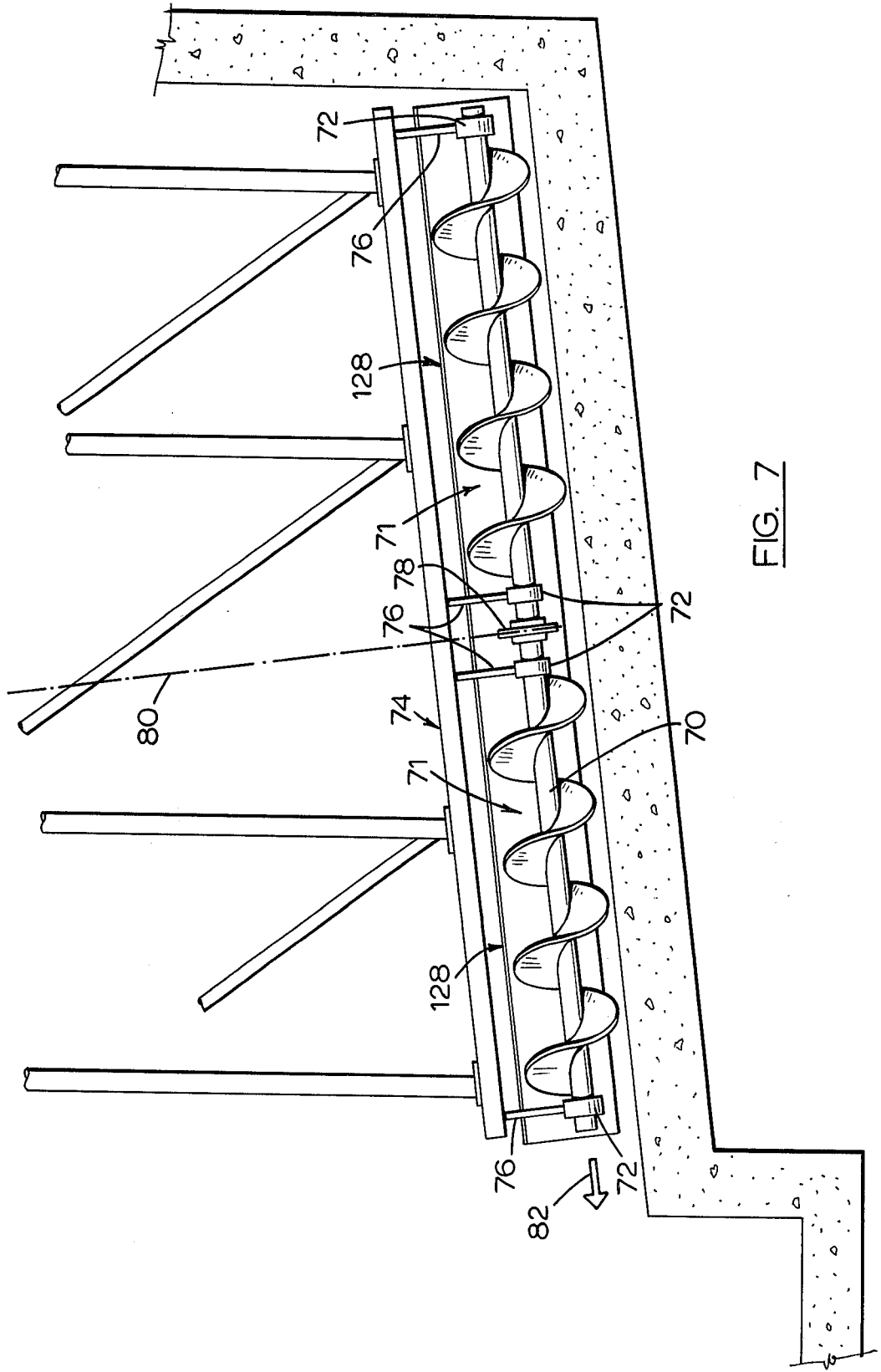
FIG. 7 is a vertical sectional view through a screw type of sludge conveyor device which may be used in the clarifier shown in FIGS. 5 and 6.
Figure 8:
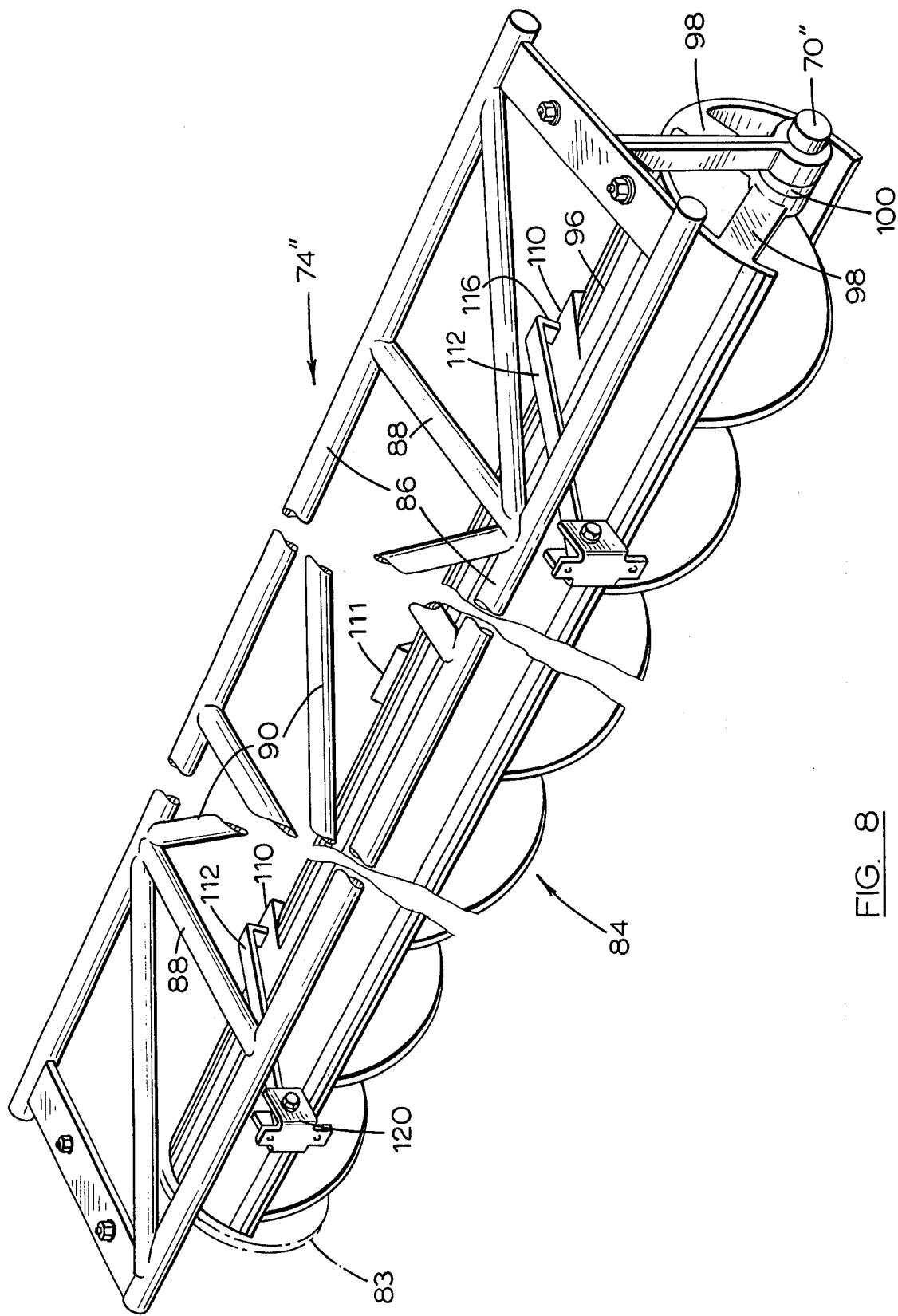
FIG. 8 is a perspective view from above of a preferred form of screw-type conveyor which may be used in the clarifier of FIGS. 5 and 6.
Figure 9:
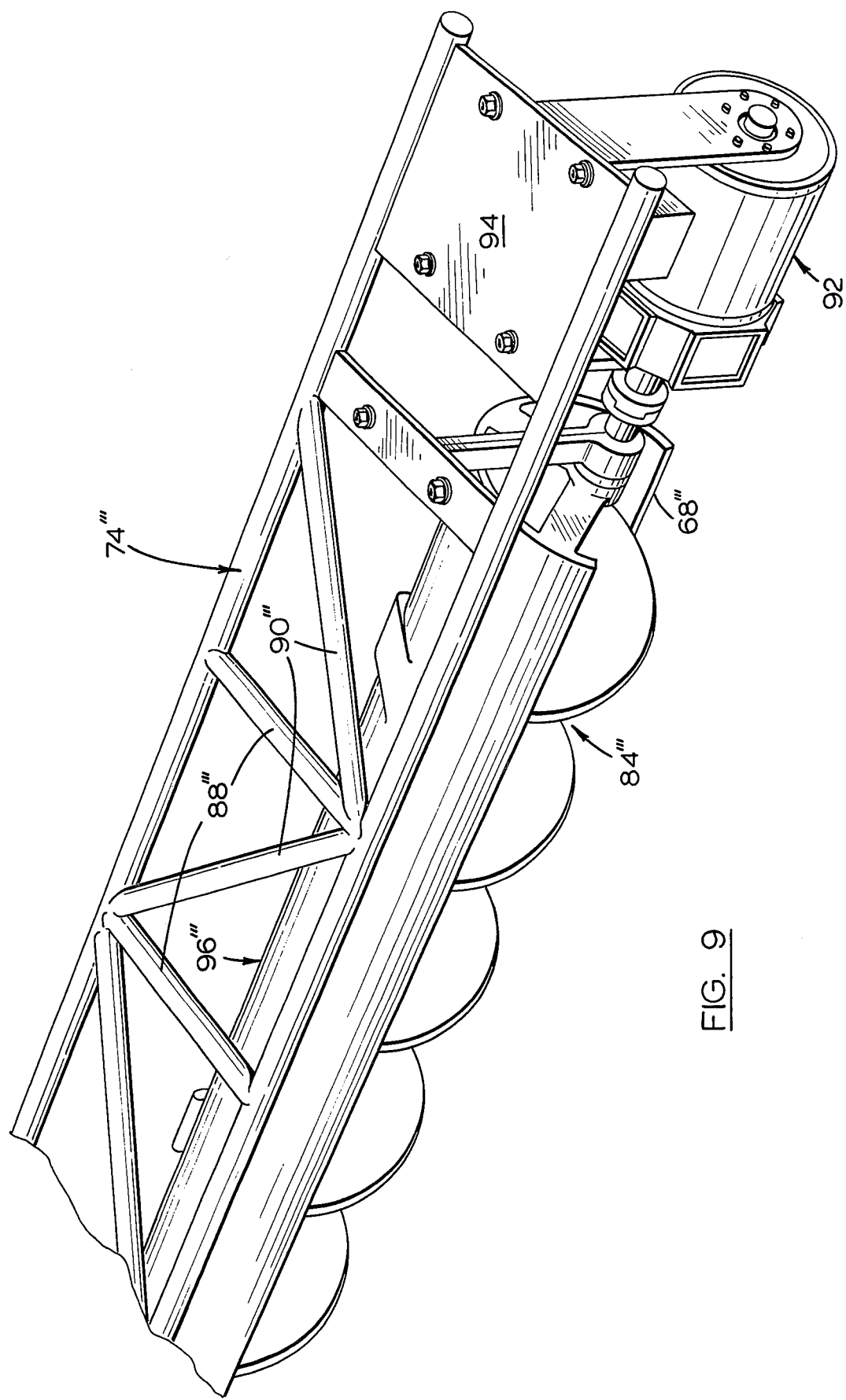
FIG. 9 is a perspective view showing a modification of the conveyor of FIG. 8.

The sludge conveyor device used in any of the above described embodiments is preferably of Archimedean screw form. FIGS. 7, 8 and 9 show three views of Archimedean screw conveyors which may be used. These conveyors will now be described in turn with particular reference to the rectangular integral clarifier shown in FIGS. 5 and 6, although it is to be understood that such conveyors could equally well be applied to circular clarifiers (FIGS. 1 and 2) or to circular integral clarifiers (FIGS. 3 and 4).

Referring first to FIG. 7, the screw conveyor shown therein includes a rotary shaft 70 fitted with two similar Archimedean screw-type screw sections 71 which are axially spaced along the shaft. Shaft 70 is mounted in bearings 72 carried by a support frame 74 which is connected to the support structure 67' of the clarifier (see FIGS. 5 and 6). The bearings 72 are suspended from the support frame 74 by way of depending struts 76. Shaft 70 is provided at its centre with a chain sprocket 78 which is connected by a chain, the centre line of which is indicated at 80, to a drive unit carried by the gantry 62' of the clarifier. One specific form of drive unit will be described later. In use, the shaft 70 is driven by way of the sprocket 78 so that the two screw sections rotate in a direction to move the sludge in the direction indicated by the arrow 82 in FIG. 7.

FIG. 8 is a perspective view from above of a very similar type of screw conveyor which is preferably used in the clarifier of FIGS. 5 and 6. This conveyor differs from the conveyor shown in FIG. 7, primarily in that it is driven by a sprocket at one end instead of at the centre. The drive sprocket is indicated in ghost outline at 83 and the conveyor has a continuous screw section denoted 84. Parts which are similar to corresponding parts in FIG. 7 are denoted by double primed reference numerals. As can be seen in FIG. 8, the support frame 74" is of generally ladder form construction having a pair of parallel side members 86 connected by transverse members 88 and inclined struts 90. The support structure which connects the frame 74" to the gantry 62' of the clarifier has not been shown in FIG. 8 to avoid obscuring the drawing.

FIG. 9 shows a modified form of the conveyor device of FIG. 8. Triple primed reference numerals are used in FIG. 9 to indicate parts which are similar to FIG. 8. The conveyor of FIG. 9 differs from that shown in FIG. 8, primarily in that it is provided with a submersible drive motor and gearbox generally denoted 92 mounted with its shaft co-axial with the shaft 68''' of the screw. The support frame 74''' is extended at its outer end (that is, the end which is highest when the screw is in use - see FIG. 6) and is provided with a support plate 94 to which the motor and gear box are bolted. The motor may be electrical in operation and will be provided with control gear which is operable from above the level of the liquid in the clarifier.

The screws used in FIGS. 7, 8 and 9 are all made of stainless steel for high abrasion and corrosion resistance. In use, the selected screw is preferably positioned so that the clearance between the bottom of the clarifier in which it is mounted and the screw is in the range one-half to three-fourths of an inch. This position is found to give most efficient operation. The screw may also be mounted in contact with the bottom of the clarifier, in which case, the screw will wear as it rotates in use until clearance exists, at which time peripheral wearing of the screw will cease. The drive to the screw in each case is arranged so that the speed of screw rotation is in the range 1 to 15 r.p.m., typically 8 to 10 r.p.m.

Where the size of the clarifier is such that a screw of substantial length is required (possibly 60 to 100 feet long or even more) it may be desirable to provide one or more support rollers on the shaft between the sections to prevent the screw sagging, particularly when there is no liquid in the clarifier. In this event, the screw may be made in a plurality of separate sections mounted on a common shaft. The or each roller may be positioned between two shaft sections. The number of rollers will depend on the length of the screw. The or each roller may be suspended by a bracket from the screw shaft and stabilized by members connected to the screw support frame.

Figure 12:
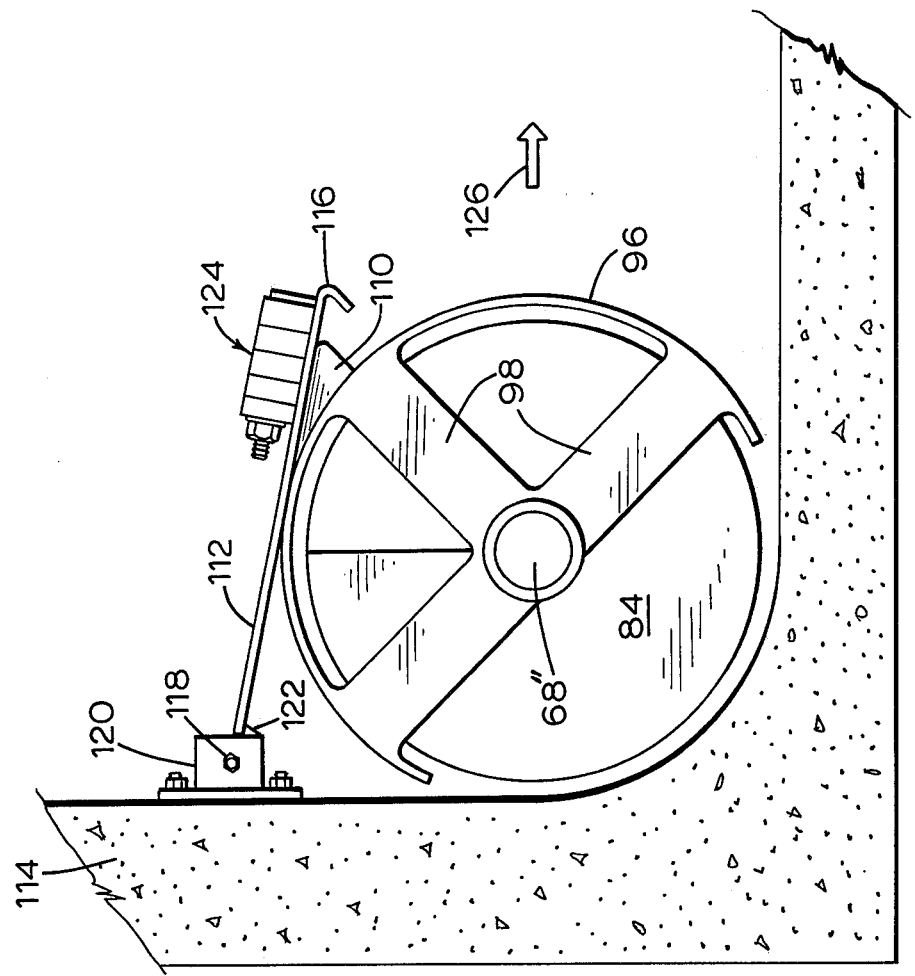
FIG. 12 is an end view of the screw shown in FIG. 8 and shows the shroud in more detail.
Figure 10:
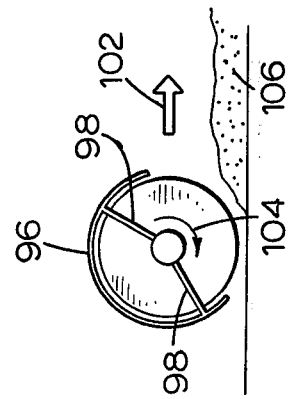
FIGS. 10 and 11 are diagrammatic end views of the conveyor device of FIG. 8 showing a shroud fitted to the device, the shroud being shown in different positions in the respective views.
Figure 11:
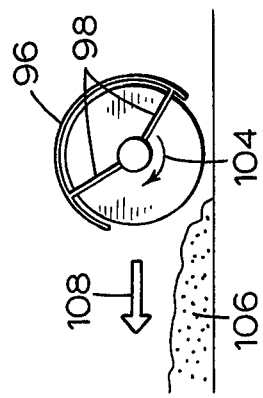

Each of the screws shown in FIGS. 7 to 9 is provided with a pivoted shroud which conforms to the shape of part of the circumference of the screw and is arranged to provide a partial enclosure which prevents sludge being expelled radially of the screw and so improves the efficiency of its operation. FIGS. 10, 11 and 12 illustrate such a shroud. In one embodiment the shroud may be fixed in a position intermediate the two positions of FIGS. 10 and 11. Although a fixed shroud may be satisfactory in some circumstances, the shroud may be pivotable so it is always disposed at the trailing side of the screw. The construction and operation of such a shroud will now be described in conjunction with the screw shown in FIG. 8. The shroud is generally denoted 96 and is of curved configuration, conforming in shape to slightly greater than half of the circumference of the screw. The shroud is carried at each end by radial struts 98 mounted in a bearing 100 on the shaft 70" of the screw. FIGS. 10 and 11 are diagrammatic views which show the principle of operation of the shroud. In FIG. 10, the screw is moving to the right in the direction of arrow 102. The direction of rotation of the screw is indicated by arrow 104. At this time, the shroud is positioned at the trailing side of the screw so that the leading edge of the screw can bite into sludge indicated at 106. In this position, the shroud prevents the sludge being thrown outwardly to the rear of and above the screw and ensures that it is conveyed laterally. When the screw is travelling in the opposite direction, as indicated by the arrow 108 in FIG. 11, the shroud has been reversed so that it is again positioned at the trailing side of the screw. The direction of screw rotation is again indicated by arrow 104. This reversal of the shroud ensures that the screw can again bite into and convey laterally sludge 16 in its path.

Reference will now be made to FIGS. 8 and 12 in describing the mechanism for reversing the position of the shroud. The shroud is provided at positions spaced inwardly from its ends with two generally triangular-section protuberances 110 which face in the same direction, and a third, similar protuberance 111 which faces in the opposite direction and is positioned intermediate the protuberances 110. Two switching arms 112 are pivoted to the wall 114 at the relevant end of the clarifier at positions corresponding to the positions of the protuberances 110. Each arm 112 is of flat rectangular shape in cross-section and has a hook 116 at its outer end shaped to engage over the leading edge of the relevant protuberance 110 on the shroud 96. The arm is carried at its inner end on a pivot pin 118 carried by a bracket 120 bolted to the wall 114. A stop 122 limits the extent to which the arm can pivot downwardly and the arm is normally biassed into its down position by weights 124 mounted adjacent its outer end. As the screw approaches the wall 114, the protuberances 110 pivot the arms 112 upwardly against the effect of the weights 124 so that the hooked outer ends 116 of the arms engage over the protuberances 110. When the direction of travel of the screw is reversed at the end of the clarifier, the screw beings to move in the direction of arrow 126 in FIG. 12. The protuberances 110 then engage behind the hooks 116. Continued movement of the screw causes the protuberances and hence the shroud to be restrained by the hooks 116 until the shroud has been pivoted into the position in which it covers the trailing portion of the screw. When the shroud reaches its reversed position, the protuberances 110 are no longer restrained by the arms 112 and the screw continues with the shroud in the reversed position. The third protuberance 111 intermediate the protuberances 110 co-operates with a correspondingly-positioned switching arm (not shown) similar to arms 112 at the opposite end of the clarifier to reverse the shroud at that end of the clarifier for the return travel of the screw. The two positions of the shroud 96 are defined by a stop (not visible) provided on the strut 76" which depends from the support frame 74". A similar shroud arrangement denoted 96''' is provided on the screw of FIG. 9. In the case of the screw shown in FIG. 7, the shroud 96 is replaced by two similar shroud sections denoted 128, each of which is similar to the shroud 96.

Figure 13:
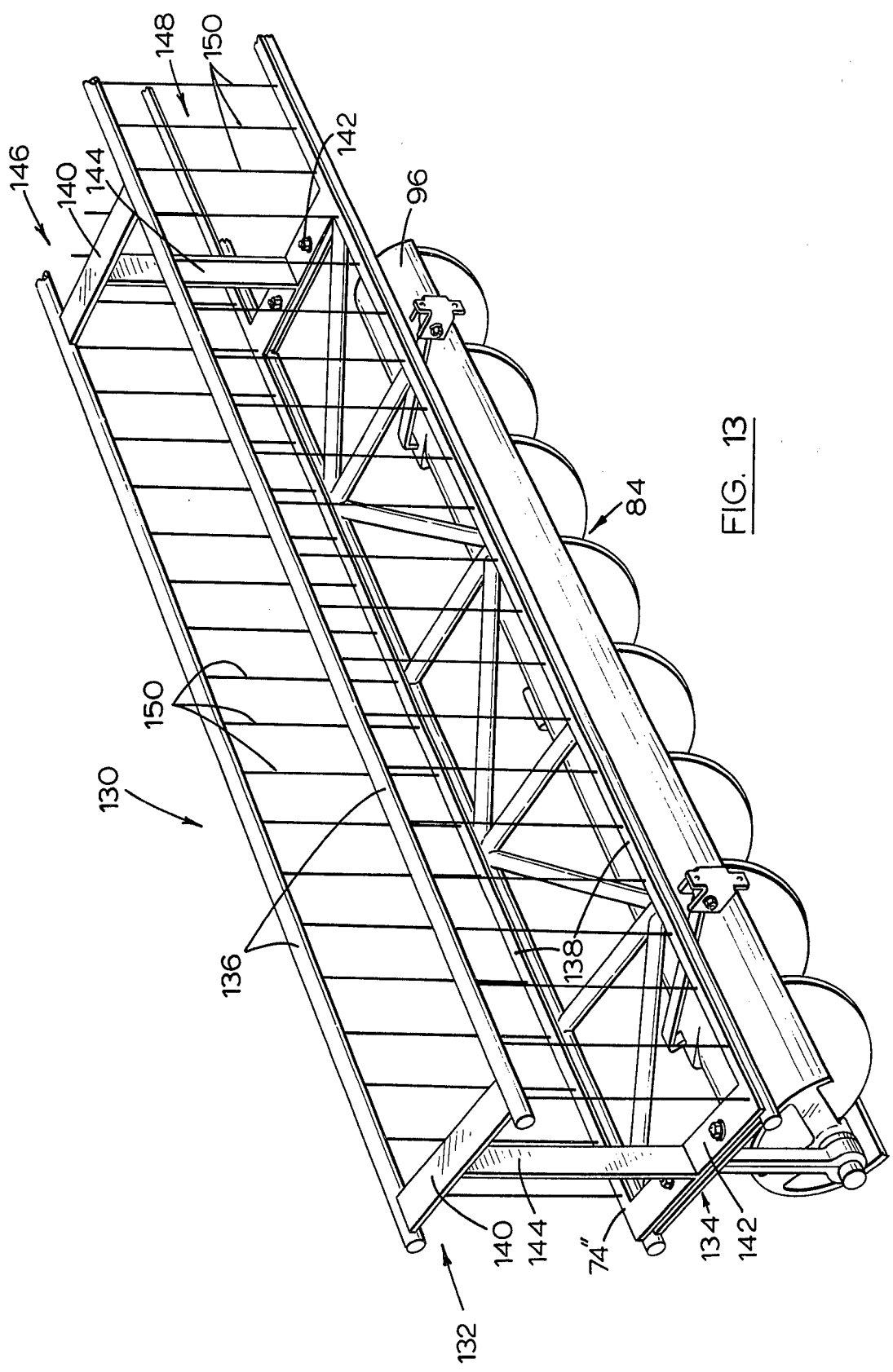
FIG. 13 is a perspective view from above of the screw conveyor device as shown in FIG. 8 modified in accordance with a further feature of the invention.

Reference will now be made to FIG. 13 which illustrates a modification of the screw conveyor shown in FIG. 8. According to this modification, a flocculation grid generally denoted 130 is mounted on the support frame 74" of the screw so that the grid moves through the liquid in the clarifier along with the screw. By way of explanation, it should be noted that biological sludges are flocculant by nature in that, under proper conditions, small particles of sludge will agglomerate (flocculate) to form larger particles having improved settling characteristics. It has been found that the speed of movement of the screw (see later) through the liquid in the clarifier is such that a flocculation grid mounted on the screw support frame promotes flocculation in the liquid. The grid comprises an upper frame 132, and a lower frame 134 which is bolted to the support frame 74" parallel to frame 132. Each frame 132, 134 includes a pair of parallel side members 136, 138 respectively connected by transverse members 140, 142 respectively. The transverse members 140, 142 of the respective frames are connected by vertical members 144 positioned so that the side members 136 of the upper frame 132 are positioned vertically above the corresponding side members 138 of the bottom frame 134. Two rows 146, 148 of spaced wires 150 extend vertically between the respective superimposed pairs of side members 136, 138. As the gantry moves the screw conveyor device through the liquid in the clarifier in use, these wires 150 also move through the liquid and it is found that this movement promotes flocculation. In this particular embodiment, the wires are of one-sixteenth of an inch in diameter and are of a height in the range 1 foot, 6 inches to 4 feet. The wires are spaced from one another by 6 inches along the side members 136, 138. The wires in the respective rows are staggered laterally by three inches with respect to one another. In alternative embodiments, different spacings and/or different diameter wires may be used.

In a modification of the arrangement according to FIG. 13, a plurality of parallel rows of wires could be provided. The wires in each row would preferably be staggered with respect to one another so as to avoid interference with one another.

It should be noted that although the flocculation grid has been described in relation to the screw arrangement of FIG. 8, it could equally well be applied to either of the other two screw arrangements of FIGS. 7 and 9.

Reference will now be made to FIGS. 14 and 15 in describing the construction of the gantry 62' of the clarifier of FIGS. 5 and 6. In FIGS. 14 and 15, the numerals used to denote the gantry, the supporting structure below the gantry and the screw conveyor device are the same as those used in FIGS. 5 and 6. The screw is of the form shown in FIG. 8 but does not have the flocculation grid of FIG. 14.

As has already been mentioned in connection with FIGS. 5 and 6, the gantry runs on a pair of rails 64' referred to in connection with FIGS. 5 and 6. The rails extend parallel to one another along opposite sides of the clarifier. The gantry is provided at each side with a pair of flanged wheels 152, 154 which run on the rails. As can be seen from FIG. 15, each pair of wheels is mounted between a pair of side plates 156 of channel shape in cross section. An axle 158 extends between the wheels 152, 154 at the right hand end of the gantry in FIGS. 14 and 15. The wheels 152, 154 at the left hand side of the gantry are mounted on respective stub axles 160, 162. Two transverse circular-section shafts 164, 166 extend between the said pairs of side members 156. The respective shafts 164, 166 are received at their ends in brackets 168, 170 on the side members of the gantry.

The gantry also includes a pair of horizontal platforms 172, 174 which support respectively the drive unit 176 for the screw 66' and the drive unit 178 which moves the gantry along the rails. Platforms 172, 174 are mounted on the transverse shafts 164, 166. Drive unit 176 includes an electric drive motor 180, the output shaft of which is connected to a speed reducing gearbox 182 by way of a torque-limiting coupling 184. The output shaft from the gearbox 182 drives a sprocket 186 which is coupled by a chain (not shown) to the drive sprocket 83 for the screw (see FIG. 8). If the screw is of substantial length, it may be necessary to provide more than one drive connection thereto. For example, the screw may be driven at both ends. This may be effected by driving a further sprocket on the screw shaft by way of chains coupled to drive unit 176. Alternatively, one or more further drive units may be provided. The or each unit would be mounted on its own platform carried by the gantry and appropriately positioned along its length. Each unit would be coupled, for example, by a chain to an associated sprocket on the shaft of the screw. In the case of a screw of, say 60 or 100 feet in length, the gantry will, of course, be of corresponding length and will accordingly provide ample space in which to accommodate further drive units.

Drive unit 178 includes a reversible electric motor 188 which drives a speed reducing gearbox 190 through a torque-limiting coupling 192. The output from this gearbox drives a further sprocket 194 which in turn drives another sprocket 196 rotatably mounted on the transverse shaft 166 referred to above. A further sprocket 198 mounted on shaft 166 is coupled to sprocket 196 and is driven thereby. This sprocket in turn drives another sprocket 200 mounted on the axle 158 between the two right-hand wheels 152, 154 of the gantry in FIG. 15. Axle 158 is in turn connected to the stub axles 160, 162 for the wheels at the left-hand end of the gantry by chain and sprocket sets generally denoted 202. When motor 188 is in operation therefore, the axle 168 is driven in rotation and in turn drives all four wheels 152, 154 so that the gantry moves along the rails. If two wheel drive only is required, the chain and sprocket sets 202 may be omitted. Only the centre lines of the chains between the sprockets 194 and 196 and between the sprockets 198 and 200 have been indicated in FIG. 15. These chains are shown at 204 and 206 respectively in FIG. 14.

The motor 188 of the gantry drive unit is coupled to a pair of limit switches 207 positioned one at each end of the gantry (FIG. 14) so that each switch is operated by abutment with the relevant end wall of the clarifier as the gantry reaches the end of its travel. Operation of either of these switches reverses the motor 188 to reverse the direction in which the gantry is moving.

The drive unit 178 is arranged to move the gantry along the rails at a speed in the range 1 – 10 feet per minute. It is found that a speed in this range is suitable not only for efficient operation of the screw conveyor device but that it also provides suitable conditions under which flocculation of suspended particles can be induced by the flocculation grid shown in FIG. 13.

The transverse shafts 164, 166 referred to above form part of a frame 208 which is of generally triangular shape in end view and which includes a third shaft 209 positioned below and parallel to shafts 164, 166. The frame also includes a plurality of cross struts 210 disposed in a lattice arrangement between shaft 209 and the shafts 164 and 166. Two of these struts are visible at 211 in FIG. 14. The supporting structures 67' for the screw 66' of the clarifier includes the frame 208 and additional depending members 212 including ties 213. Frame 208 is pivoted to the gantry as will be described in such manner that the frame 208 and support structure 67' together with the screw 66' can be pivoted from the normal position shown in full lines in FIG. 14 to an elevated position denoted 214 and shown in dotted lines, in which position the screw 66' is exposed for inspection, maintenance or repair purposes.

The frame 208 includes the shafts 164 and 166 referred to above. The brackets 170 which receive the ends of shaft 166 are arranged to allow the shaft to turn therein. The brackets 168 for the other shaft 164 have hinged caps 215 which can be raised to release the shaft. Accordingly, if the caps 215 are raised, the supporting structure 67' and the screw 66' carried thereby can be pivoted about shaft 166 to the elevated position 214. In this position, the structure 67' and screw 66' are supported clear of the water for inspection, maintenance, or repair purposes. Movement of the structure and screw between the submerged position and the elevated position 214 is effected by means of a hoist 216 which is mounted on the relevant end wall of the clarifier and is connected to the bottom of the support structure 67' by a cable 218. The cable can be detected from the hoist and retained on the gantry when the gantry is in normal operation. When the screw is to be brought to the surface, the gantry is positioned at a spacing from the end wall of the clarifier on which the hoist is mounted and the motor 188 is stopped to bring the gantry to rest. Motor 180 is also stopped so that the screw stops rotating. A lock pin indicated at 220 is passed through aligned holes in the bottom flange 222 of one of the side members of the gantry and a plate 224 welded to the relevant rail 64' supporting the gantry. The cable 218 is then detached from the gantry and coupled to the hoist and wound in to elevate the screw and supporting structure to the position indicated at 214. The screw is returned to its submerged position by reversing the hoist to pay out cable 218 until the supporting structure 67' reaches its vertical position. The bracket caps 215 are then hinged back to secure the structure in this position. Finally, lock pin 220 is removed.

The frame 208 referred to above carries a scum skimmer 225 designed to skim the surface of liquid in the clarifier as the gantry is reciprocated. Reference will now be made to FIGS. 16 to 19 in describing the skimmer.

The skimmer includes a pair of skimmer blades 226, 228 positioned to skim the surface of the liquid in the clarifier. Each blade is carried by a holder 230, 223 respectively and each holder is mounted on the outer ends of a pair of shafts 234, 236 respectively carried by the frame 208. Only one shaft in each pair is visible in the drawings, the shafts being spaced along frame 208.

At its inner end, each shaft 234, 236 is pivoted to the shaft 209 of frame 208. Stays 240, 242 are pivoted at their respective outer ends to the respective arms 234, 236 and at their inner ends are pivoted to a bracket 244 which is slidably mounted on a shaft 246 (see FIGS. 17 and 18) which upstands vertically from the shaft 209 of frame 208. A compression spring 248 extends between the two brackets 238, 244 to help compensate for the weight and assist operation of the skimmer. One shaft 246 and associated spring 248 is provided adjacent each end of frame 208.

Figure 16:
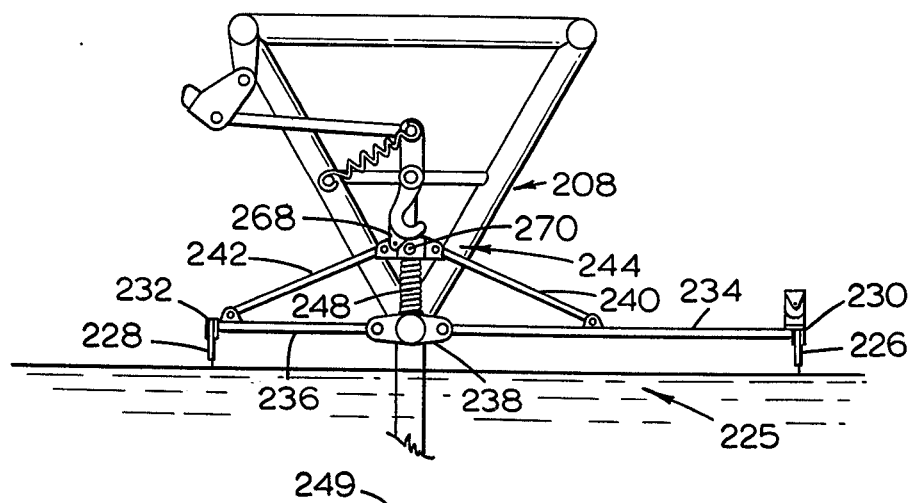
FIGS. 16 to 19 are sequential views illustrating the operation of a scum skimmer device which is shown in association with the sludge conveyor device in FIG. 14.
Figure 17:
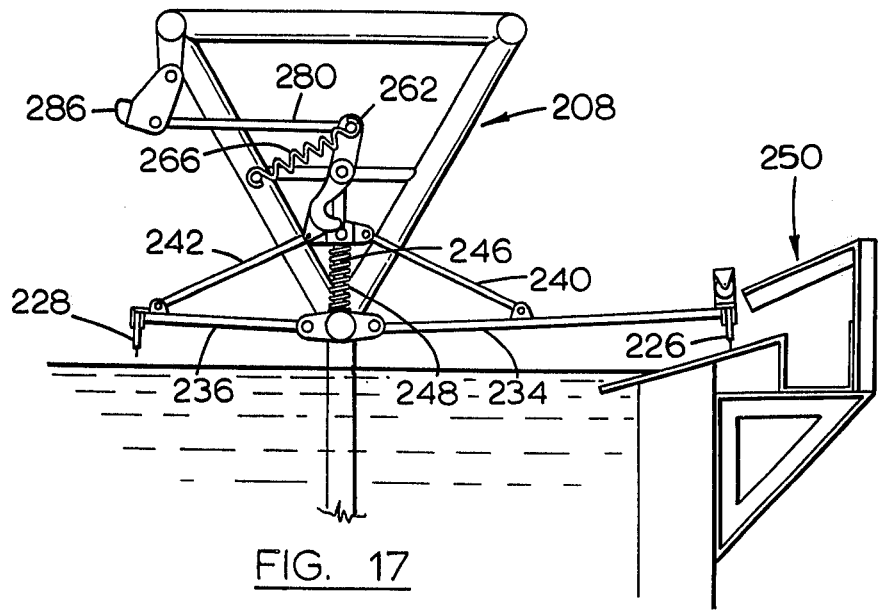
Figure 18:
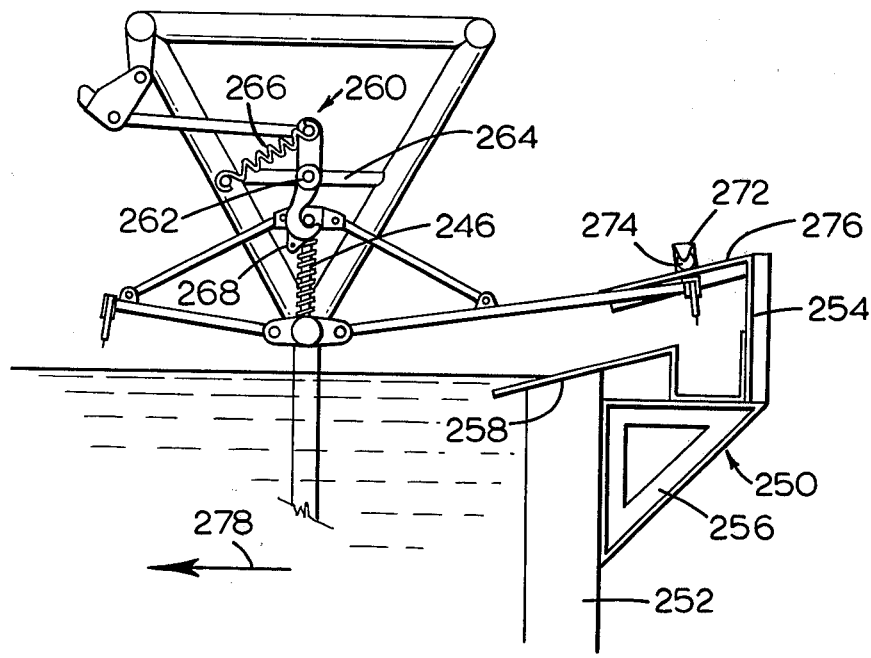
Figure 19:
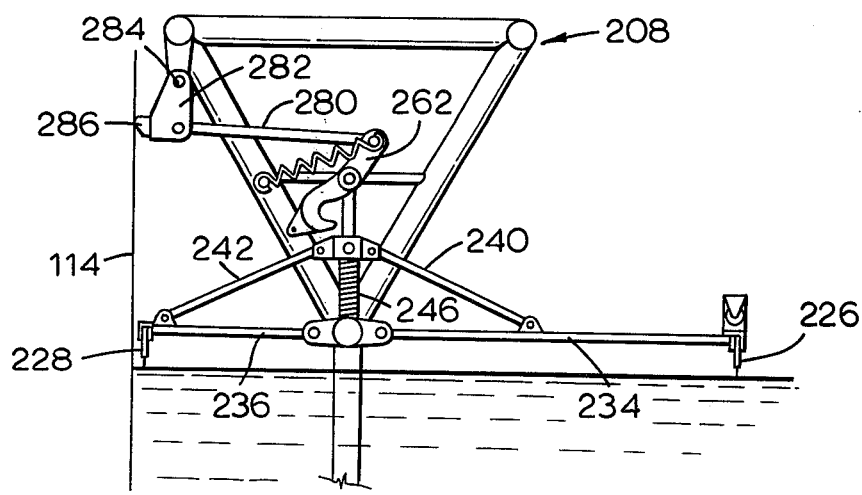

The intention is that the skimmer blades 226 to 228 will be arranged in their down positions as shown in FIG. 16 when the gantry is traversing in the direction of the arrow 249 in FIG. 16. Accordingly, the blades 226, 228 will skim the surface of the liquid in the clarifier and will move any scum towards the right-hand end of the clarifier considering the clarifier as viewed in FIGS. 14 to 19. Referring now to FIG. 18, a scum box 250 is mounted on the right-hand wall 252 of the clarifier and includes a box-form receptacle 254 supported by a bracket 256. A ramp 258 inclines upwardly to the edge of the receptacle 254 nearest the liquid from a position in which the outer end of the ramp is submerged below the liquid. The idea is that, as the leading skimmer blade 226 approaches the scum box, the blade will ride up the ramp 258, as shown in FIG. 17. This will cause the arms 234 which carry the blade to pivot upwardly about their inner ends. In turn, this will move the stays 240 upwardly at their inner ends, lifting the brackets 244. This upward movement of the brackets will also lift the stays 242 at the other side of the skimmer and will accordingly lift the other skimmer blade 228. The intention is that the two blades will be locked in their elevated positions clear of the surface of the liquid whilst the gantry returns to the other end of the clarifier. In this way, the surface of the liquid is skimmed in one direction only so that the scum is continuously moved towards the scum box 250. Scum left by the trailing skimmer blade 228 when it is raised, as shown in FIG. 17 will, of course, be picked by the leading blade 226 on its next pass.

The blades are locked in their raised positions by two similar latching mechanisms, one adjacent each end of frame 208. Only one of these mechanisms is shown in the drawings; it is denoted 260 and will now be described as representative of both mechanisms. Mechanism 260 includes a hook shaped latch 262 which is pivoted to a cross member 264 of the frame 208. The latch member 262 is normally biassed in the counter clockwise direction viewed from the position of FIGS. 16 to 19 by a tension spring 266. As can be seen from FIG. 16, the latch member is normally disposed in a vertical position, being held against rotation due to the action of spring 266 by means of a protuberance 268 on the lower end of the latching member, which engages a pin 270 on the bracket 244. As this bracket is raised when the leading skimmer blade 266 rides up the ramp 258, as shown in FIG. 17, the pin 270 deflects the latching member 262 in the clockwise direction. A bracket 272 of inverted L-shape is mounted on the outer end of the arm 234 which carries the leading skimmer blade 226 so that the bracket is positioned above the blade. The bracket in turn carries a roller 274 which is positioned to ride up an overhead ramp 276 arranged above the scum receptacle 254. This ramp causes the outer end of the arm 234 to be raised to a position at which the pin 270 on the bracket 244 snaps into the hook at the lower end of the latching member 262. This member then retains the two pairs of arms 234, 236 with their outer ends upwardly disposed so that the skimmer blades 226 and 228 respectively are held clear of the surface of the water. FIG. 18 shows the skimmer mechanism in this condition at the point at which the gantry reverses and begins to transverse in the opposite direction as indicated by the arrow 278 in FIG. 18.

Roller 274 runs down the latching ramp 276 as the gantry begins to reverse and the skimmer blades 226, 228 remain elevated until the gantry reaches the opposite end of its transverse. The latching mechanisms 260 are then simultaneously released to allow the skimmer blades to return to the surface of the liquid under its own weight, which is slightly more than that required to compress springs 246. Release of each latching mechanism is effected by a release arm 280 which is coupled at one end to the upper end of the latching member 262 and which is pivoted at its opposite end to a bracket 282 which is also pivoted at 284 to the frame 208. Bracket 282 is provided with an abutment 286 positioned to contact the wall 114 at the opposite end of the clarifier to wall 252. This causes the bracket 282 to turn about pivot 284 in a direction to displace the arm 280 to the right in FIG. 19. This in turn causes the latch member to pivot in the clockwise direction, releasing the pin 270 on bracket 244 and allowing the bracket to return downwardly under its own weight. Accordingly, the skimmer blades 226, 228 are returned to the surface of the liquid. At this time, the gantry is again reversed by the limit switches referred to above and again commences its transverse in the opposite direction.

Figure 20:
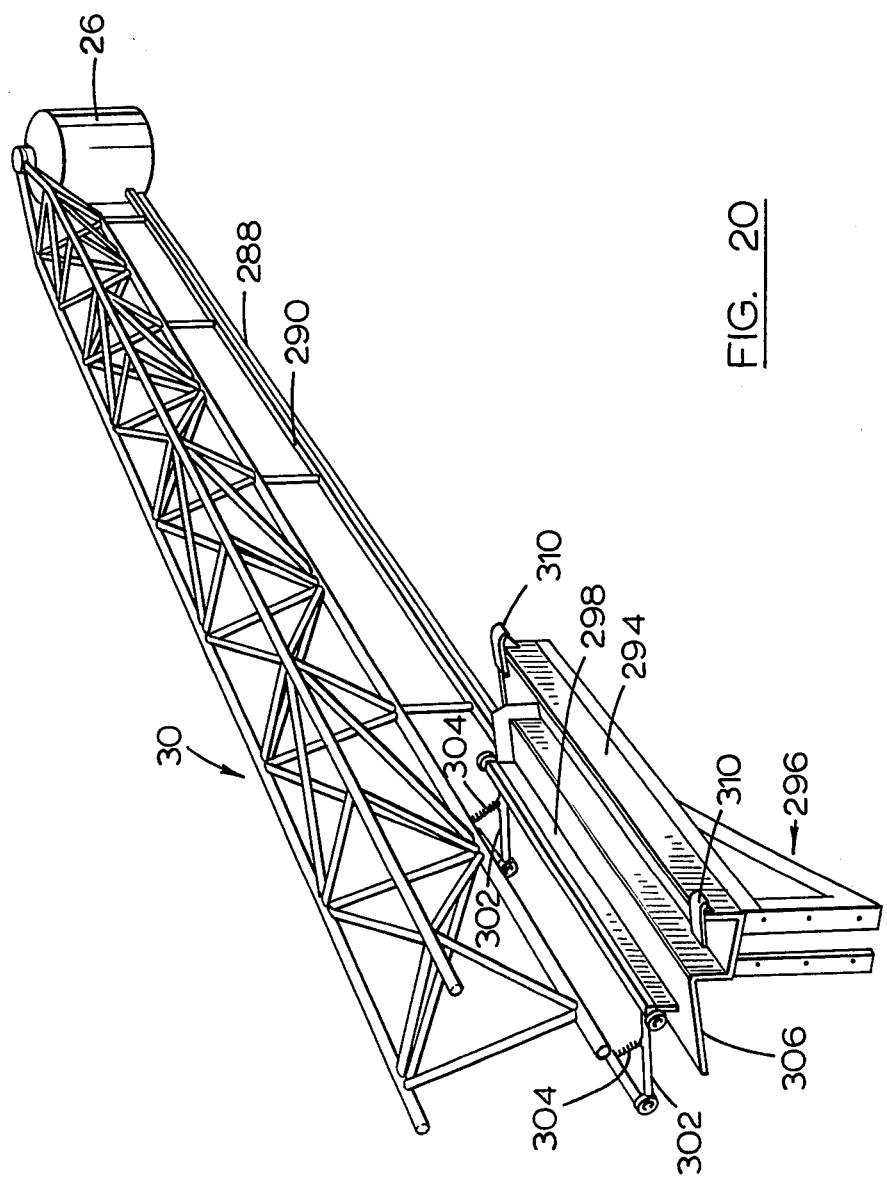
FIG. 20 is a perspective view of a gantry and scum skimmer device which may be applied to a conventional circular clarifier of the form shown in FIGS. 1 and 2.

FIG. 20 shows a scum box arrangement which may be used with a circular clarifier of the forms shown in FIGS. 1 and 2. In FIG. 20 the gantry is denoted by the reference numeral 30 used in FIGS. 1 and 2 and is rotatable about its central column 26 of the clarifier. A main, fixed skimmer blade 288 is mounted below the gantry 30 and extends from the column 26 over a substantial portion of the length of the gantry 30. Blade 288 is carried by a support structure 290 coupled to the gantry 30 so that the blade 288 is positioned to skim the surface of the liquid in the clarifier as the gantry 30 rotates. Accordingly, this blade 288 skims a circular area adjacent the centre of the clarifier, as indicated by the area bordered by the ghost outline 292 in FIG. 1. The scum skimmed by blade 288 tends to travel outwardly of the clarifier due to the centrifugal action of the rotating blade.

A scum box 294 is supported by a structure 296 so as to project inwardly of the clarifier above the liquid in a radial position. The scum box is indicated in ghost outline at 294 in FIG. 1. A separate skimmer blade 298 is provided adjacent the outer end of the gantry 30 to skim the portion of the surface of the liquid outside the ghost outline 292 in FIG. 1. This blade picks up scum which is moved outwardly over the surface of the liquid due to the action of the blade 288 and delivers the scum into the scum box 294. Blade 298 is carried by a support bar 300 which is coupled to the gantry 30 by a pair of arms 302. The arms are connected at their outer ends to the bar 300 and at their inner ends to the gantry. Compression springs 304 normally bias the blade 298 into a position in which it just contacts and skims the surface of liquid in the clarifier. The scum box 294 is provided with a ramp 306 at one side, up which the blade 298 rides as it approaches the scum box. At the top of the ramp, the blade discharges its contents into the scum box. Guides 310 prevent the blade dropping into the box and guide it over the outer wall of the latter and back onto the surface of the liquid. As in the case of the scum box applied to the rectangular clarifier, the box is periodically emptied by pumping away accumulated sludge.

Figure 21:
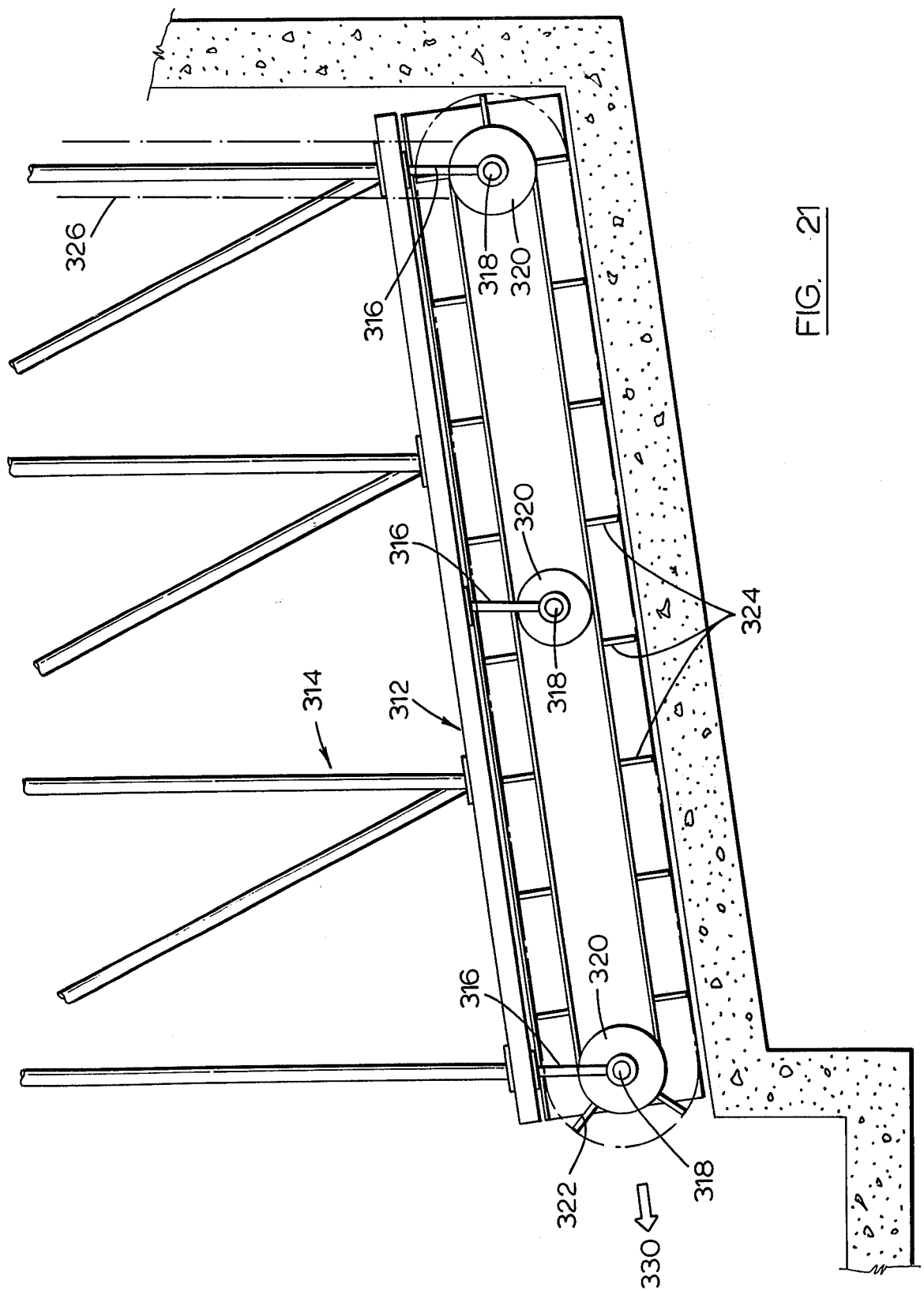
FIG. 21 is a view similar to FIG. 7 showing a belt-type conveyor in accordance with a modification of the invention.

Reference will now be made to FIG. 21 which shows an alternative form of sludge conveyor device which may be used in place of the screw conveyor. However, the device of FIG. 21 is not considered to be a preferred form of conveyor. In FIG. 21, the conveyor is provided with a support frame denoted 312 which is carried by a supporting structure 314, both of which may be similar to the arrangements described in relation to FIGS. 7 to 9. The support frame 312 carries three pairs of depending struts 316 between the lower end of each pair of which is mounted a shaft 318 carrying a roller 320. A continuous belt 322 extends around and is supported on the rollers 320 and is provided with a plurality of transverse plate-form flights 324.

The shaft 318 at the upper end of the conveyor carries at one end a drive sprocket (not visible) around which passes a chain indicated at 326 driven from a drive unit carried by the gantry of the mechanism. The belt is arranged so that the flights of its bottom run are spaced from and parallel to the bottom of the clarifier by a distance in the range one-half to three-fourths inch. In use the drive chain 326 drive the upper roller 318 to cause the belt to circulate in the direction indicated by arrow 328, so that sludge in the path of the flights 324 of the conveyor is conveyed in the direction of arrow 330. The belt may be made of, for example, rubber. The flights 142 may be made from metal, wood or a plastic material.

Figure 22:
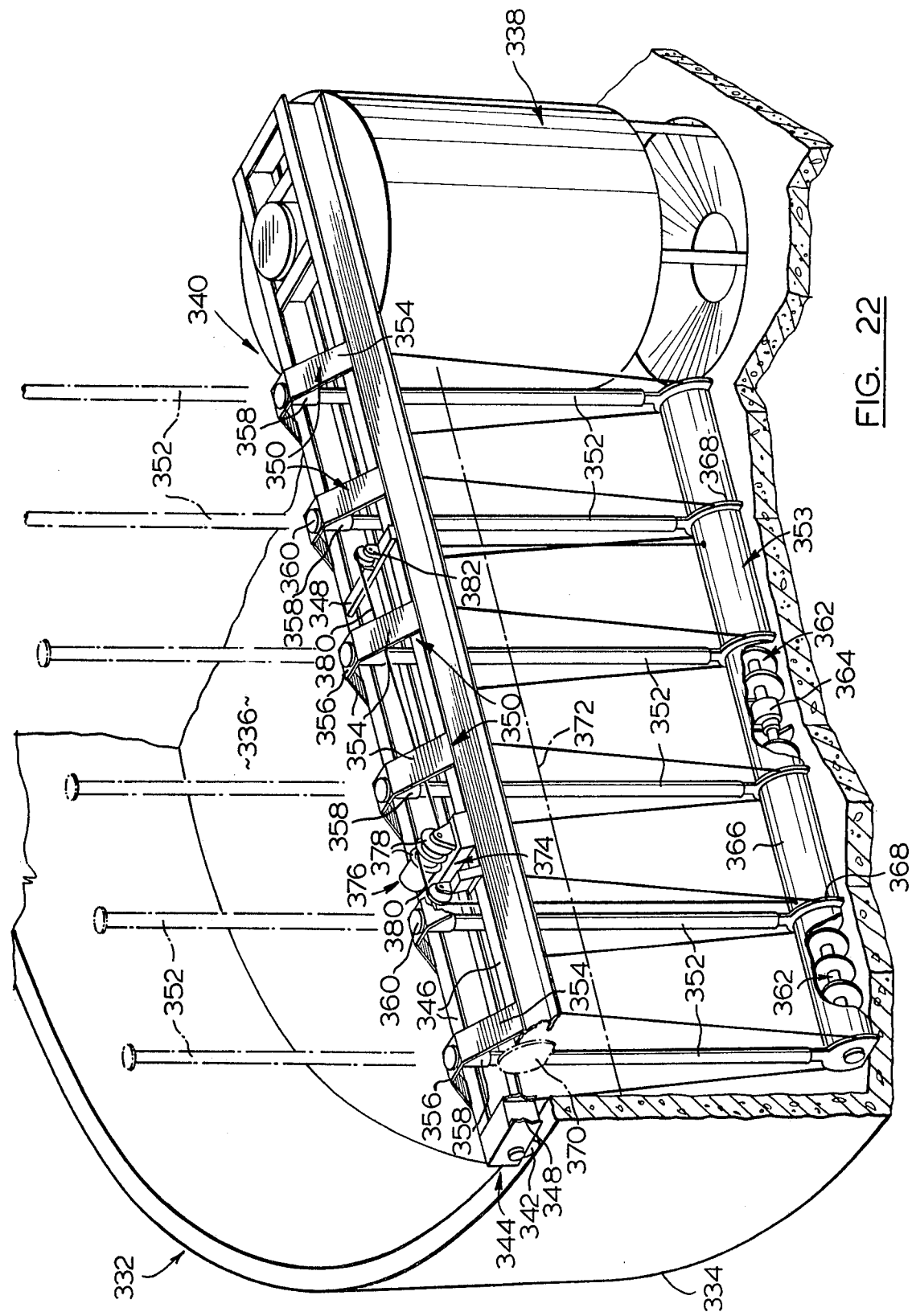
FIG. 22 is a perspective view of part of a circular clarifier having a screw conveyor and a mechanism for raising the conveyor above the surface of the liquid in the clarifier.

FIG. 22 shows part of a circular clarifier having a screw-type sludge conveyor and a mechanism for raising the conveyor to a position above the level of the liquid in the clarifier, e.g. for maintenance or/and repair purposes. In the drawing, the clarifier tank is generally denoted 332 and includes a peripheral side wall 334 and a bottom wall 336. A column structure 338 is mounted in the center of the clarifier and supports one end of a gantry 340, the opposite end of which is fitted with a wheel 342 which runs on the upper edge of the side wall 334 of the tank. In this embodiment, the gantry is driven to rotate about the structure 338 by a drive motor 344 which is carried by the gantry and which is connected to the wheel 342 so as to drive the latter at an appropriate speed. The speed will be selected to give a speed of the order described in connection with the embodiment of FIGS. 1 and 2.

The gantry 340 includes parallel longitudinal members 346 and transverse members 348 extending between the longitudinal members. Part of the transverse member 348 at the outer end of the gantry and part of one of the adjoining longitudinal members 346 have been broken away in FIG. 22 for clarity of illustration. In addition to the transverse members 348, a series of screw support brackets 350 extend between the longitudinal members 346. Each bracket slidably receives a vertical column 352 forming a support for a normally submerged screw conveyor device generally denoted 353.

Each of the brackets 350 includes two upwardly and inwardly inclined limbs 354 connected at their upper ends by a horizontal plate 356. A sleeve 358 depends from the underside of plate 356 and slidably receives the relevant one of the columns 352. Each column is of cylindrical shape in cross-section and is provided at its upper end with a head in the form of a disc 360. The columns are vertically slidable in the sleeves 358 from the full line positions in which they are shown in FIG. 22 when the screw conveyor device 353 is submerged, to the elevated positions indicated in chain line in the elevated position of the conveyor device.

The conveyor device includes a screw similar to the screw shown in FIG. 7, which is made in two co-axial parts 362. A hydraulic screw drive motor 364 is positioned between the two parts of the screw for rotating the said parts about their common longitudinal axis. A supply pump for the motor 364 is mounted on the gantry 340 and is coupled to the motor by piping. However, the pump and piping has been omitted from FIG. 22 for clarity of illustration. The motor 364 and the screw parts 362 are housed in a shroud 366 and the screw parts are rotatably coupled to the shroud by bearings, all as described previously. Each of the screw support column 352 mentioned above is coupled to the screw conveyor device 353 by a bracket 368 which is fixed to the shroud and to the lower end of the relevant support column 352.

In FIG. 22, the screw conveyor device 353 is shown in full lines in its normal position of use in which it is submerged in the liquid in the tank. The whole device can be lifted from its submerged position to the elevated position indicated in chain lines at 370, e.g. for maintenance or/and repairs purposes. In this position, the conveyor device is located wholly above the surface of the liquid in the clarifier. Typically, the liquid level would be such as is indicated at 372. Movement of the device between these two positions is effected by means of a cable lifting mechanism including a winch 374 having a drive motor 376. The winch 374 includes two co-axial drums 378, on the surface of each of which is wound a cable 380. Cables 380 extend horizontally from the winch 374 in opposite directions to respective pulleys 382 on the gantry. Each cable is then directed downwardly and is coupled at its lower end to the shroud 366 of the conveyor device. Operation of the motor 376 in the appropriate direction to wind in both of the cables causes the screw converger device 353 to be lifted from the submerged position to the elevated position 370. Return of the conveyor device 353 to its submerged condition is effected by allowing the cables 380 to unwind from the winch 374 under the controlled braking effect of the motor 376 so that the devvice sinks under its own weight. The motor 344 for rotating the gantry and the winch motor 376 are hydraulic motors although it will be appreciated that suitable electric motors could be used in both instances. Also, a submersible electric motor could be used in place of the hydraulic screw drive motor 364.

Figure 23:
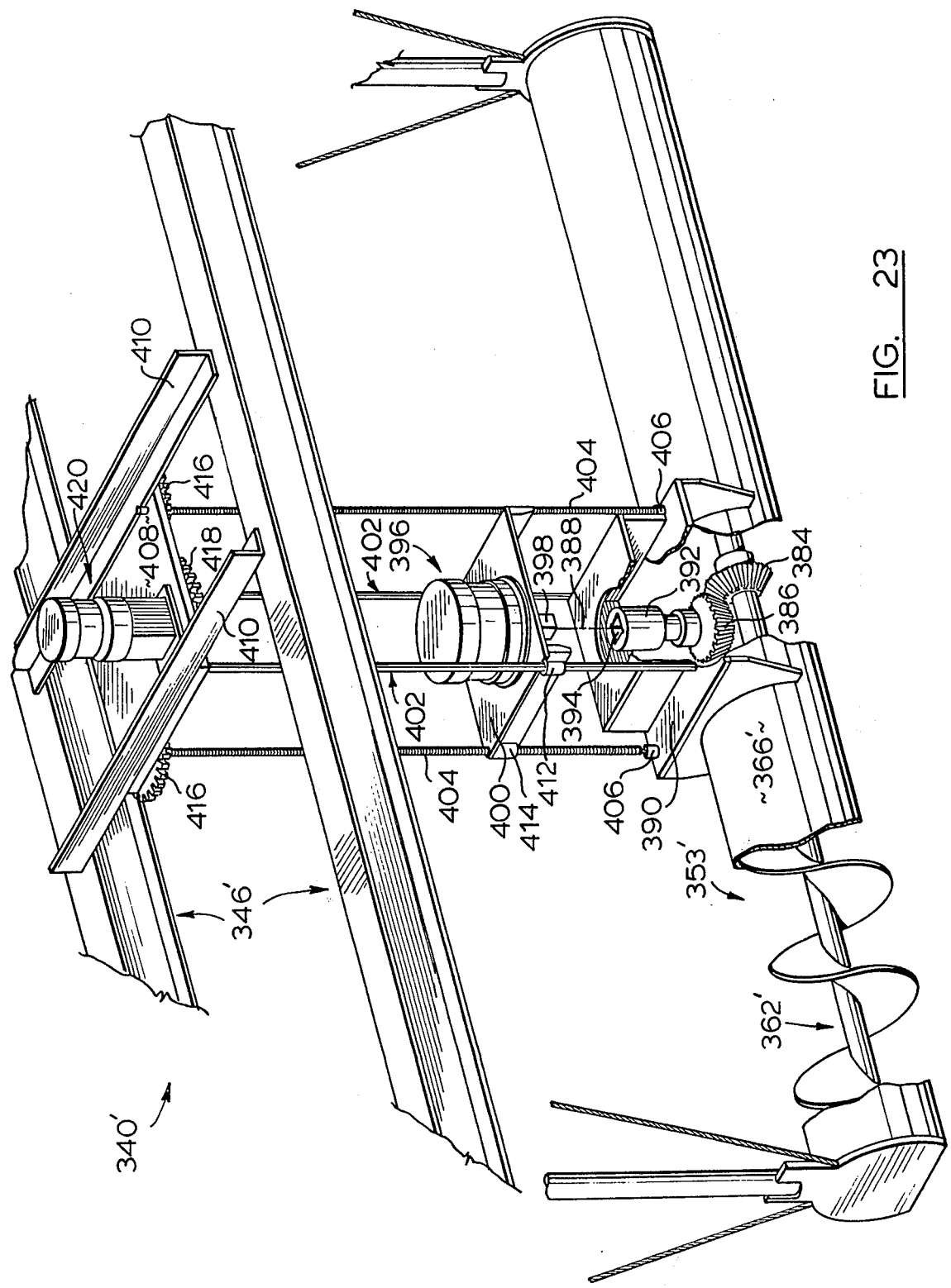
FIG. 23 is a perspective view, partly broken away, of an alternative screw conveyor and lifting mechanism for use in the clarifier of FIG. 22.

FIG. 23 shows an alternative screw lifting mechanism for a circular clarifier. Since the mechanism of FIG. 23 is used in an environment similar to that shown in FIG. 22, details of the clarifier itself are not shown in FIG. 23. In this latter view, the screw conveyor device and gantry are both similar to the corresponding parts in FIG. 22 and are designated by primed reference numerals corresponding to the numerals used in that figure.

The arrangement of FIG. 23 differs from the FIG. 22 arrangement primarily in that the screw conveyor device 353' is permanently submerged in the liquid in the clarifier. The screw drive motor only can be raised above the surface of the liquid. This is because experience indicates that the motor is the primary maintenance and repair item of the conveyor device. In the unlikely event that the screw itself required attention, it would be necessary to drain the clarifier of liquid in the arrangement of FIG. 23.

The screw conveyor device 353' includes two sections 362' as in FIG. 22 but in this case, the drive motor between the two sections is replaced by a bevel gear 384 which meshes with a similar gear 386 mounted to rotate about a vertical axis 388 in a housing 390 supported on the shroud 366' of the screw conveyor device. The bevel grear 386 is fitted with a coupling 392 having at its upper end a square shaped socket 394.

The drive motor for the screw is denoted 396 and is arranged with its axis of rotation coincident with the axis 388 about which bevel gear 386 rotates. The drive motor 396 includes a depending output shaft 398 which is of a shape complimentary to the shape of the socket 394 in coupling 392. Drive motor 396 is supported by a horizontal platform 400 which is guided for vertical movement (as will be described) between a bottom position in which the shaft 398 is engaged in the socket 394 for driving the screw, and a top position in which the motor 396 is located above the level of the liquid in the clarifier.

Drive motor 396 is supported for movement between the said bottom and top positions by four vertical rods, two of which are plain and two of which are screw threaded. The plain rods are denoted 402 in FIG. 23 and the screw-threaded rods are denoted 404. Each plain rod 402 is fixed at its lower end to the housing 390 for the bevel gears 384 and 386. Each screw-threaded rod 404 is turnably received in a bush 406 on the housing. At their upper ends, the rods are coupled to a platform 408 supported between a pair of angle members 410 which members themselves extend transversely between the longitudinal members 346' of the gantry 340'. Rods 404 are turnably received in bushes (not shown) similar to the bushes 406.

The rods 402, 404 are arranged adjacent the four respective corners of the platform 400 for the screw drive motor 396. The two plain rods 402 are slidably received in respective plain collars 412 on the platform 400. Each screw-threaded rod 404 is received in a complimentary internally screw threaded collar 414 on the platform. Adjacent its upper end, each rod 404 is fitted with a gear wheel 416. The two gear wheels 416 mesh with a driving gear wheel 418 coupled to the output shaft of a hydraulic motor 420. Motor 420 is mounted with its axis vertical on the upper side of platform 408.

It will be appreciated that operation of motor 420 causes the two screw threaded rods 404 to rotate in the same direction, raising or lowering the platform 400 carrying the screw drive motor 396 depending on the direction in which the rods rotate. In this way, the drive motor 396 can be moved between the said top and bottom positions. As the motor approaches its bottom position, its output shaft 398 will engage in the socket 394 of coupling 392 so that the motor will be drivably coupled to the screw. To facilitate this engagement of shaft 398 and socket 394 the coupling 392 is connected to the associated bevel gear 386 so that the coupling can turn angularly to a limited extent without wheel 386 turning. In other words there is a certain amount of free play between coupling 392 and bevel gear 386. In addition, the output shaft 398 may be chamfered at its outer end and/or the socket 394 may be provided with a flared opening.

The two lifting arrangements shown in FIGS. 22 and 23 have been described in connection with a circular clarifier. It is however to be understood that either of the arrangements could be used in association with a rectangular clarifier or in a clarifier which is of arcuate shape as shown in FIGS. 3 and 4. Also, the two arrangements of FIGS. 22 and 23 could both be used simultaneously in the same clarifier. In that event, the clarifier would have the facility for raising either the whole screw conveyor complete with drive motor or for raising the drive motor alone.

Reference will now be made to FIGS. 24 to 27 in describing screw conveyor arrangements having an alternative type of screw drive means. These arrangements will be described in connection with a circular clarifier of the type shown in FIGS. 1 and 2, although it is to be understood that similar arrangements may, with suitable modification, be used in any type of clarifier.

Figure 24:
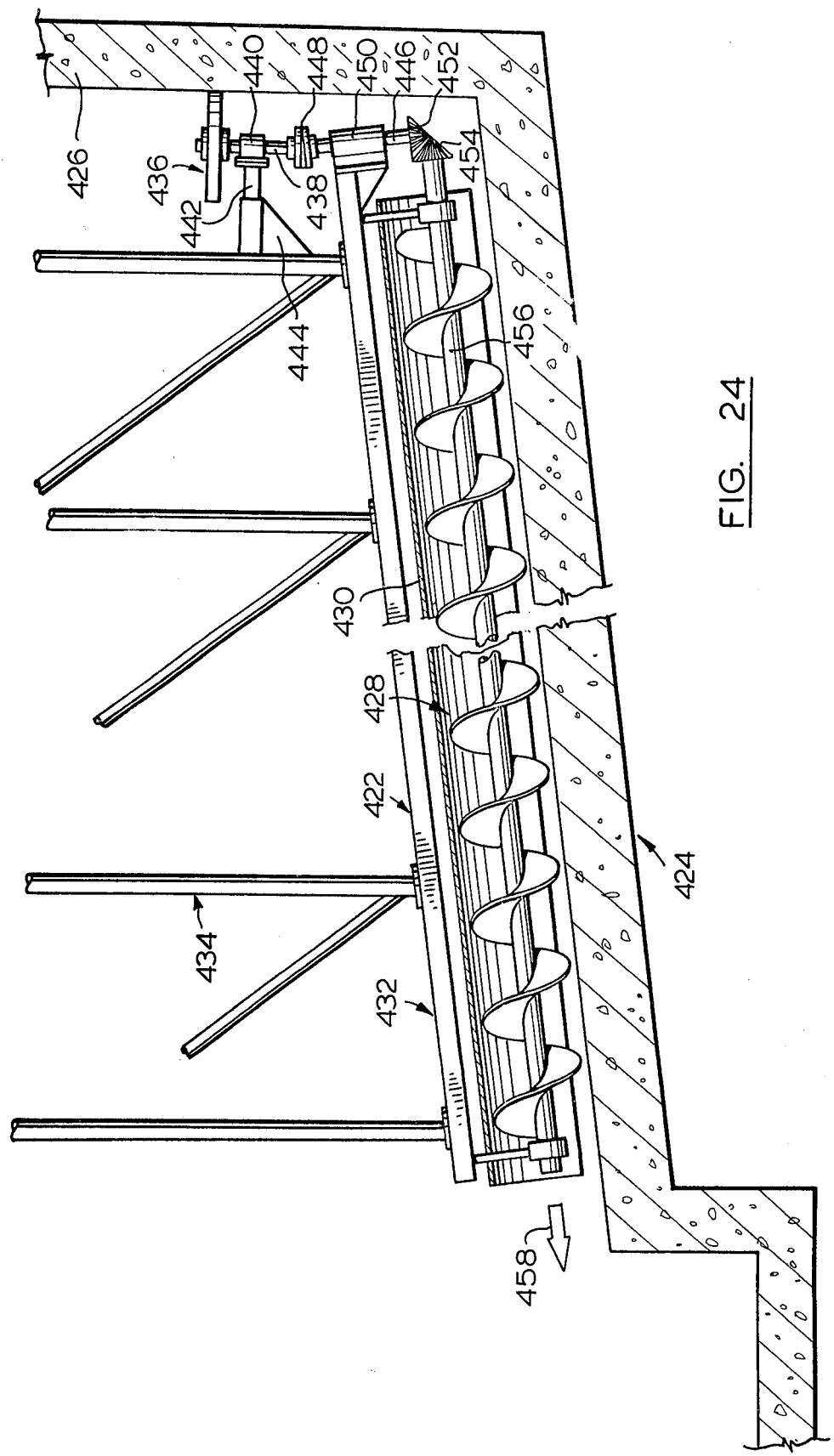
FIG. 24 is a vertical sectional view through part of a clarifier having a screw conveyor driven by a drive wheel running in contact with a side wall of the clarifier.

FIG. 24 shows a screw conveyor generally denoted 422 in use in a clarifier having tank which includes a bottom wall 424 and side wall 426. As described previously, the screw conveyor device includes a screw 428 having a shroud 430 and a support frame 432 from which the screw is suspended. Numeral 434 indicates the support structure coupling the screw support frame with the gantry (not shown) of the clarifier.

In this embodiment, the screw is driven by a drive wheel 436 which runs in contant with the inner surface of the side wall 426 of the tank. The wheel is mounted on a drive shaft 438 fitted with a bearing 440 which is coupled to the support structure 434 by way of an arm 442 and a bracket 444. At its lower end, shaft 438 is coupled to a further shaft 446 by way of a universal joint 448. Shaft 446 is jounalled in a bearing 450 coupled to the screw support frame 432. A bevel gear 452 on the lower end of shaft 446 meshes with a similar gear 454 on the inner end of the shaft 456 of the screw.

It will be appreciated that, as the gantry of the moves with respect to the clarifier wall 426 in use, the drive wheel 436 turns and drives the screw in rotation by way of the bevel gears 452 and 454. The size of the drive wheel 436 and the sizes of the bevel gears 452 and 454 are selected according to the speed at which the screw is to be driven. The speed will preferably be in the range discussed above.

FIGS. 25 and 26 show an alternative arrangement in which primed reference numerals have been used to denote parts which correspond with FIG. 24. In the alternative arrangement, the screw 428' is in two sections denoted 460. A drive wheel 462 is mounted on the shaft 456' of the screw between the two sections 460 and runs in contact with the bottom 424' of the tank of the clarifier. Accordingly, as the screw moves over the bottom of the tank in use, the wheel 462 is driven and drives the screw.

FIG. 26 shows the wheel 462 in cross-section and also shows a section through the shroud 430' from the screw. The shroud is fixed and defines gaps 464 at both sides of the screw for the entry of sludge.

FIG. 27 shows a modification of the arrangement of FIGS. 25 and 26 in which double primed reference numerals are used to denote parts which correspond with FIGS. 25 and 26. In this case, the drive wheel is denoted 466 and is mounted at a spacing from the screw so as to be rotatable about an axis parallel to the axis of the screw. Drive wheel 466 includes an axle 468 which is rotatably mounted in bearings carried by brackets 470 coupled to the shroud 430" for the screw. A sprocket 472 is mounted on shaft 468 adjacent the wheel 466 and is coupled by a chain 474 with a similar but smaller sprocket 476 mounted on the shaft 456" of the screw. It will be appreciated that the difference in sizes between the two sprockets 472 and 476 will cause the screw to rotate faster than the wheel 466. By appropriately selecting the size of the wheel 466 and the sizes of the sprockets 472 and 476, an appropriate speed of screw rotation may be achieved.

It will of course be appreciated that there are many other possible ways of driving the screw from a drive wheel running in contact with the bottom or the side wall of the clarifier tank. The examples illustrated in the drawings and described above show typical arrangements and are not to be considered as exhaustive. Other fixed speed or even variable speed gearing and like arrangements may be employed to achieve suitable screw drive speeds.

Further, in order to increase traction and prevent slippage of the drive wheel, the wheel may run on a track provided in the inner surface of the relevant wall of the clarifier tank. The track may take the form of a separate insert attached to or embedded in the wall. Alternatively, the track may be integrally formed on the inner surface of the wall. In any event, the surface of the track will preferably be roughened to minimize the risk of slippage. The exterior surface of the drive wheel may be correspondingly roughened. In fact, the wheel and track may be formed with complimentary teeth in the manner of a rack and pinion arrangement.

Where a drive wheel arrangement is employed in a clarifier of the type in which the screw reciprocates back and forth over the bottom of the clarifier (e.g. as in FIGS. 3 and 4 and in FIGS. 5 and 6) means must be provided to ensure that the screw rotates unidirectionally in both directions of reciprocation. These means may take many forms as will be appeciated by a person skilled in the art. For example, two drive wheel could be provided each driving on one of the side walls of the clarifier. Each wheel would operate to rotate the screw in one direction of reciprocation of the screw. These means may take the form of a mechanism triggered by abutment with respectively opposite end walls of the clarifier tank as the screw reverses its direction of reciprocation. Another alternative would be to provide two wheels driving on the same wall respectively above and below a driven shaft, and ratchet means associated with each wheel and arranged so that one of the wheels would drive the screw in each direction of reciprocation of the latter over the bottom of the clarifier. A further alternative would be to arrange for a single drive wheel to be movable between two positions respectively above and below a driven shaft and to provide means for moving the wheel between those two positions upon reversal of the direction of travel of the screw.

It will be appreciated that the sludge conveyor means provided by the invention ensures positive movement of sludge and promotes prompt removal of sludge from the clarifier. This in turn allows the width of the clarifier to be increased, providing a corresponding increase in the capacity of the clarifier.

It will further be appreciated that the above description applies to specific embodiments of the invention only and that many modifications are possible within the broad scope of the invention. For example, it is to be understood that the conveyor means according to the invention may be used not only in clarifiers but also in the other apparatus for use in the gravity separation of suspended material from liquids.

What I claim is:

1. A clarifier for use in the gravity separation of suspended particles from a liquid, the clarifier including:
   a tank for receiving liquid to be clarified, the tank being of rectangular shape in plan and including a bottom having sludge outlet means through which settled sludge can be removed;
   a gantry supported for movement above the surface of liquid in the tank;
   gantry drive means adapted to cause the qantry to reciprocate from end to end of the tank in the performance of repeated passes over said liquid surface;
   a sludge conveyor device which is submerged in liquid in the tank in use at a clearance above the bottom of the tank;
   support means coupling the conveyor device to the gantry so that the device moves with the gantry and sweeps over the bottom surface of the tank as the gantry performs said repeated passes above the surface of the liquid in the tank;
   the conveyor device including: a screw which has a helical blade and which is arranged transversely with respect to the direction of movement of the gantry, so as to move sludge which has settled on the bottom of the charifier in said transverse direction towards said outlet means, the screw being positioned with its axis parallel to the bottom of the tank and spaced therefrom by an amount sufficient to provide for clearance between the bottom of the tank and the blade of the screw; means for driving the screw in rotation about said axis; a shroud which extends around part of the circumference of the screw to confine sludge in the region of said helical blade, the shroud being co-extensive with the screw and having an arcuate cross-sectional shape corresponding to the profile of the screw; means coupling the shroud with the screw for free pivotal movement about the longitudinal axis of the screw between two operative positions in each of which the shroud trails with respect to the direction of movement of the gantry so that a leading portion of the screw is exposed for action or sludge in its path; and shroud reversing means located at each end of the clarifier and adapted to engage the shroud as it approaches the reversing means and to restrain the shroud as it moves away from the reversing means each time the gantry reverses its direction of movement in reciprocating from end to end of the tnak, whereby the shroud is caused by said reversing means to automatically move into the other of its two positions.

2. A clarifier for use in the gravity separation of suspended particles from a liquid, the clarifier including:
   a tank for receiving a liquid to be clarified, the tank including a bottom surface having sludge outlet means through which settled sludge can be removed, and a side wall defining an upright inner surface;
   a gantry supported for movement above the surface of liquid in the tank;
   gantry drive means adapted to cause the gantry to perform repeated passes over said liquid surface;

a sludge conveyor device which is submerged in liquid in the tank in use at a clearance above the bottom of the tank;

supported means coupling the conveyor device to the gantry so that the device moves with the gantry and sweeps over the bottom surface of the tank as the gantry performs said repeated passes above the surface of the liquid in the tank;

the conveyor device including a screw which has a helical blade extending about a longitudinal shaft which defines a longitudinal axis of the screw, the screw being arranged with its axis disposed both transverse to the direction of movement of the gantry, so as to move sludge which has settled on the bottom of the tank towards said outlet means, and parallel to and spaced from the bottom surface of the tank by an amount sufficient to provide for clearance between the bottom of the tank and the blade of the screw; and, means for driving the screw in rotation, said means including a driving wheel carried by the conveyor device for movement therewith and drivably coupled to said longitudinal shaft of the screw, said wheel being arranged in driving contact with one of said surfaces of the tank, whereby the wheel is rotated due to its contact with said surface and drives the said screw as the conveyor device sweeps over the bottom surface of the tank in use.

3. A clarifier for use in the gravity separation of suspended particles from a liquid, the clarifier including:

a tank which is of rectangular shape in plan and which includes a bottom surface having sludge outlet means through which settled sludge can be removed from the tank;

a gantry supported for movement above the surface of liquid in the tank;

gantry drive means adapted to cause the gantry to reciprocate from end to end of the tank in the performance of repeated passes over said liquid surface;

a sludge conveyor device which is submerged in liquid in the tank in use at a clearance above the bottom of the tank;

conveyor drive means coupled to the sludge conveyor device;

support means coupling the conveyor device to the gantry so that the device moves with the gantry and sweeps over the bottom of the tank as the gantry performs said repeated passes above the surface of the liquid;

the conveyor device having at least one sludge-contacting surface which, when the device is in operation, moves in a direction transverse to the direction of movement of the gantry and towards said outlet means;

a scum box positioned at one end of the tank;

scum skimming means including: at least one skimmer blade which extends transversely with respect to the direction of movement of the gantry; a pair of elongate blade support elements which are spaced longitudinally of said blade and which have outer ends coupled to the blade and inner ends coupled to the gantry for pivotal movement about a horizontal axis so that the blade is movable between a normal skimming position and an elevated position clear of the surface of liquid in said tank; and means biassing the blade into said normal skimming position;

the scum box including a ramp positioned in the path of said skimming blade and arranged to lift the blade from said skimming position to said elevated position when the blade approaches said scum box as a result of movement of the gantry towards the box when the clarifier is in use; and, in association with at least one of said elongate blade support elements, locking means for retaining the skimmer blade in said elevated position during movement of the gantry in a direction away from said scum box, said locking means being disposed above the liquid in the clarifier and including: detent means coupled to said elongate blade support element and vertically movable in response to movement of said skimmer blade from said skimming position to said elevated position; a pivotally mounted latch coupled to said gantry and movable between an operative position for engagement with said detent means, and a release position; means biassing the latch into said operative position so as to engage the detent means as the skimmer blade moves to said elevated position in use; and release means coupled to said latch and operable by contact with an abutment at the end of said tank opposite to said scum box to move said latch said release position and allow the skimmer blade to return to its skimming position for return movement of the gantry towards the scum box.

4. A clarifier as claimed in claim 3, wherein the scum skimmer means further comprises: an additional scum skimmer blade, said blades being arranged in parallel positions at respectively opposite sides of said gantry; and a further pair of elongate blade support elements spaced longitudinally of said additional blade and having outer ends coupled to the blade and inner ends coupled to the gantry for pivotal movement about horizontal axis parallel to the pivotal axis of the first mentioned blade support elements, said detent means being coupled to one of said support elements for said additional blade so that both blades can be held in elevated positions by said latch.

* * * * *